US006996288B2

(12) United States Patent
Sun

(10) Patent No.: US 6,996,288 B2
(45) Date of Patent: Feb. 7, 2006

(54) METHOD OF CALCULATING SHADING CORRECTION COEFFICIENTS OF IMAGING SYSTEMS FROM NON-UNIFORM AND UNKNOWN CALIBRATION STANDARDS

(76) Inventor: Gang Sun, 146 Riverview Blvd, St. Catherines, Ontario (CA) L2T 3M5

( * ) Notice: Subject to any disclaimer, the term of this patent is extended or adjusted under 35 U.S.C. 154(b) by 773 days.

(21) Appl. No.: 09/964,607

(22) Filed: Sep. 28, 2001

(65) Prior Publication Data

US 2002/0054712 A1 May 9, 2002

Related U.S. Application Data

(60) Provisional application No. 60/236,945, filed on Sep. 28, 2000.

(51) Int. Cl.
*G06K 9/40* (2006.01)
(52) U.S. Cl. .................................... 382/274
(58) Field of Classification Search ............... 382/274; 358/461; 348/615
See application file for complete search history.

(56) References Cited

U.S. PATENT DOCUMENTS

| | | | | |
|---|---|---|---|---|
| 4,760,464 A | * | 7/1988 | Sakano | 358/461 |
| 5,062,144 A | * | 10/1991 | Murakami | 382/274 |
| 5,347,370 A | * | 9/1994 | Ishihara et al. | 358/461 |
| 5,371,613 A | * | 12/1994 | Arimoto et al. | 358/461 |
| 5,798,847 A | * | 8/1998 | Aerts | 358/464 |
| 6,665,093 B2 | * | 12/2003 | Lee | 358/1.9 |

* cited by examiner

*Primary Examiner*—Brian Werner
*Assistant Examiner*—Christopher Lavin
(74) *Attorney, Agent, or Firm*—Bereskin & Parr

(57) ABSTRACT

A method of calculating shading correction coefficients for an imaging system from a non-uniform and unknown calibration standard is disclosed. The standard may be of two or more dimensions and divided into several parts. The standard is imaged in an initial position to obtain a set of initial image intensities corresponding to defined regions on the standard. The standard is then repositioned and imaged in one additional re-arrangement for each of its dimensions. For each re-arrangement, an set of re-arranged image intensities are obtained. The initial and re-arranged image intensities are combined mathematically to determine a shading error for each of the defined regions, based on a value selected for one or more of the shading errors. The shading errors are inverted to provide a set of shading correction coefficients. Either of the shading errors or the shading correction coefficients may be normalized to eliminate the effect of the selected value. Calculation errors in the system may be reduced by calculating shading errors based on two or more calibration standards and then calculating a mean or weighted average shading error for each defined region.

52 Claims, 17 Drawing Sheets a: horizontal interval of calibration regions
b: vertical interval of calibration regions

METHOD OF CALCULATING SHADING CORRECTION COEFFICIENTS OF IMAGING SYSTEMS FROM NON-UNIFORM AND UNKNOWN CALIBRATION STANDARDS

This application claims the benefit of U.S. Provisional Patent application Ser. No. 60/236,945, filed Sep. 28, 2000 which is incorporated herein by this reference.

FIELD OF THE INVINTION

The present invention relates to a process for analyzing shading errors in an imaging system and determining shading correction coefficients to compensate for non-uniformity in illumination, optics and imaging sensors and electronics.

BACKGROUND OF THE INVENTION

Images acquired by an imaging system are not perfect. One common type of distortion is shading error (systematic intensity variation across acquired images), which is mainly caused by:

i. Photo-electronic conversion (sensors) inhomogenity;
ii. Illumination inhomogenity;
iii. Optical inhomogenity;
iv. Electronic inhomogenity.

If not corrected, shading error will distort quantification performed from image intensities. It will also distort the visual appearance of the acquired images.

In the prior art, shading errors and shading correction coefficients of imaging systems are calculated from the image of a calibration standard (or reference) with uniform reflectance, transmittance, or emission across the entire field of view. Typically, the materials in a calibration standard are the same or have the same characteristics of the materials to be imaged. For example, to correct a fluorescent imaging system, a slide covered by a thin layer of fluorescent material with uniform thickness and density may be used as a calibration standard. The fluorescent substance in the calibration slide should have the same excitation/emission properties as those to be imaged and/or analyzed subsequently.

Typically, an imaging system is used to image and/or to analyze objects in a continuous fashion. That is, every point in the field of view is of interest. In this case, pixel-by-pixel shading corrections should be performed. FIG. 1 illustrates the mapping between object plane and image sensor plane. The rectangular area 200 in the object plane of an imaging system 250 is projected to the image sensor 202 of the imaging system 250. The area 200 is also referred to as the field of view of the system 250. In the example shown in FIG. 1, the image sensor 202 consists of 48 sensor elements 206 (or pixels) in an 8×6 array, denoted as pxl(x, y), x=1, ..., 8 and y=1, ..., 6. Correspondingly, there are 8×6 divisions 205, denoted as Rp(x, y), x=1, ..., 8 and y=1, ..., 6, in the field of view 200 in the object plane. The region Rp(x, y) is projected and focused to sensor element pxl(x, y) through the lens 201 of the imaging system 250. In this example, there will be 8×6 shading correction coefficients, each of which is an integrated (average) coefficient of the corresponding region.

If the image sensor of an imaging system has $N_P$ by $M_P$ elements, and $IC_P(x, y)$ is the image pixel intensity of pixel pxl(x, y) of an uniform calibration standard, the pixel-by-pixel shading error $SE_P(x, y)$ is defined in EQ. 1. Typically, shading errors are normalized so that the average of all errors equals to one.

$$SE_P(x, y) = \frac{IC_P(x, y)}{\frac{1}{N_P \times M_P} \sum_{i=1}^{N_P} \sum_{j=1}^{M_P} IC_P(i, j)} \qquad \text{EQ. 1}$$

For $x = 1, ..., N_P$ and $y = 1, ..., M_P$

Typically, an imaging system is a linear device. That is, the raw pixel gray levels of the imaging system have a linear relationship with the input signal. For example, when imaging an illuminant object, the input signal is the self-emitted light intensity from the object. In the linear case, image intensity $IC_P(x, y)$ is the raw pixel gray-level of the pixel pxl(x, y) minus a stored background value of the corresponding pixel. In the non-linear case, the non-linear relationship first is modeled, and then this non-linear model is used in calculating the imaging intensity $IC_P(x, y)$ from the raw gray-levels so that the image intensity $IC_P(x, y)$ is linear with the input signal. If the image intensity is not linear to the input signal or the background values are not properly removed, the calculated shading error will not be accurate. In such a system, a skilled person will be capable of adjusting the image intensity values so that they have a linear relationship with the input signal.

FIG. 2 generalizes the pixel-by-pixel shading error concept. Instead of establishing shading correction coefficients of a region corresponding to each single pixel for the entire field of view, shading correction coefficients can be established for regions corresponding to more than one pixel. The pixel-by-pixel example of FIG. 1 is a special case of this generalized model.

In the example shown in FIG. 2, there are 3×2 regions 215, denoted as R(x, y): x=1, 2, 3 and y=1, 2. Each of these regions projects to its corresponding pixel set 216, denoted as P(x, y): x=1, 2, 3 and y=1, 2, in the imaging sensor 202. Each pixel set in this example contains four pixels. For example, P(1, 1), corresponding to R(1, 1), consists of: {pxl(1, 1), pxl(2, 1), pxl(1, 2), pxl(2, 2)}. The generalized shading correction has 3×2 coefficients, and each coefficient corresponds to an area of 4 pixels. Of course, the regions do not have to be in a regular 2-dimensional matrix form. They can be in any form. For the convenience of discussion, the regular 2-dimensional matrix form is used in this document. The calibration standard may be 1-dimensional or 3-dimensional or may have a non-rectangular 2-dimensional form.

Given a calibration standard with uniform regions R(x, y): x=1, ..., N and y=1, ..., M, the shading error SE(x, y) for the region R(x, y) (or pixel set P(x, y)) is defined in EQ. 2.

$$SE(x, y) = \frac{IC(x, y)}{\frac{1}{N \times M} \sum_{i=1}^{N} \sum_{j=1}^{M} IC(i, j)} \qquad \text{EQ. 2}$$

For $x = 1, ..., N$ and $y = 1, ..., M$ where: IC(x, y) is the image intensity of region R(x, y). It is calculated by averaging the image pixel intensities of all the pixels corresponding to region R(x, y).

Once the shading error is defined, the shading correction coefficient SC(x, y) for the region R(x, y) is defined in EQ. 3.

$$SC(x, y) = \frac{1}{SE(x, y)} \quad \text{EQ. 3}$$

For $x = 1, \ldots, N$ and $y = 1, \ldots, M$

The shading correction coefficients $SC(x, y)$ will then be stored and applied to subsequent images to compensate for the system's shading error.

The key requirement of the prior art is uniformity. However, uniform calibration standards are often difficult or impossible to prepare, and, therefore, the resulting estimated shading correction coefficients are often inaccurate.

Another method for calculating the shading correction coefficients is using calibration standards with non-uniform but known local reflectance, transmittance or emission values. Again, it is often very difficult to accurately determine the required reflectance, transmittance or emission values at all the required locations, especially in microscopic imaging applications.

SUMMARY OF THE INVENTION

The present invention provides a method for calculating the shading correction coefficients for an imaging system from non-uniform and unknown calibration standards.

A calibration standard which corresponds to the item or material to be imaged is first selected. The calibration standard may have one, two or three dimensions. Potentially, the calibration standard may have more dimensions. Preferably, the calibration standard covers all or most of the field of view of the imaging system. The calibration standard is divided into regions and imaged to calculate an initial image intensity. The calibration standard is re-arranged and imaged again to determine a set of re-arranged image intensities. The process of re-arranging and image is repeated once for each dimension of the calibration standard.

The initial image intensity and re-arranged image intensities are combined mathematically to form a set of equations in which a shading error for each region may be calculated based on the shading error of another region or regions. By selecting a value for the shading error of one region, an intermediate shading error of each region may be calculated. The shading error may then be calculated as the normalized value of the intermediate shading error. The shading correction coefficient for each region may be calculated by inverting the shading error for that region.

The shading correction coefficients may then be used to correct the image intensity values for an actual object imaged using the imaging system.

The calibration standard need not have uniform regions, as long as each region has the same characteristics as the object to be imaged. Differences between the regions are abstracted out of the determination of the shading correction coefficient by the present invention.

In one aspect, the present invention provides a method for calculating shading correction coefficients for an imaging system, comprising the steps of defining a set of calibration regions on a calibration standard; defining a first part and a second part of said calibration standard, wherein each of said first and second parts contains at least one calibration region; taking an image of said calibration standard and calculating an initial image intensity for each of said calibration regions; re-arranging said first and second parts to form a re-arrangement of said calibration standard; taking an image of said re-arrangement and calculating a re-arranged image intensity for each of said calibration regions; calculating a shading error for each of said calibration regions; and calculating a shading correction coefficient for each of said calibration regions.

In another aspect, the present invention provides a method for calculating shading correction coefficients for an imaging system, comprising the steps of: defining a set of calibration regions on a calibration standard; defining a first part, a second part, a third part and a fourth part of said calibration standard, wherein each of said first, second, third and fourth parts contains at least one calibration region; taking an image of said calibration standard and calculating an initial image intensity for each of said calibration regions; re-arranging said first, second, third and fourth parts in a first direction to form a first re-arrangement of said calibration standard; taking an image of said first re-arrangement and calculating a first re-arranged image intensity for each of said calibration regions; re-arranging said first, second, third and fourth parts in a second direction to form a second re-arrangement of said calibration standard; taking an image of said second re-arrangement and calculating a second re-arranged image intensity for each of said calibration regions; calculating a shading error for each of said calibration regions; and calculating a shading correction coefficient for each of said calibration regions.

BRIEF DESCRIPTION OF THE DRAWINGS

Several exemplary embodiments of the present invention will now be described, by way of example only, with reference to the drawings, in which.

DETAILED DESCRIPTION OF THE INVENTION

Figure 1:
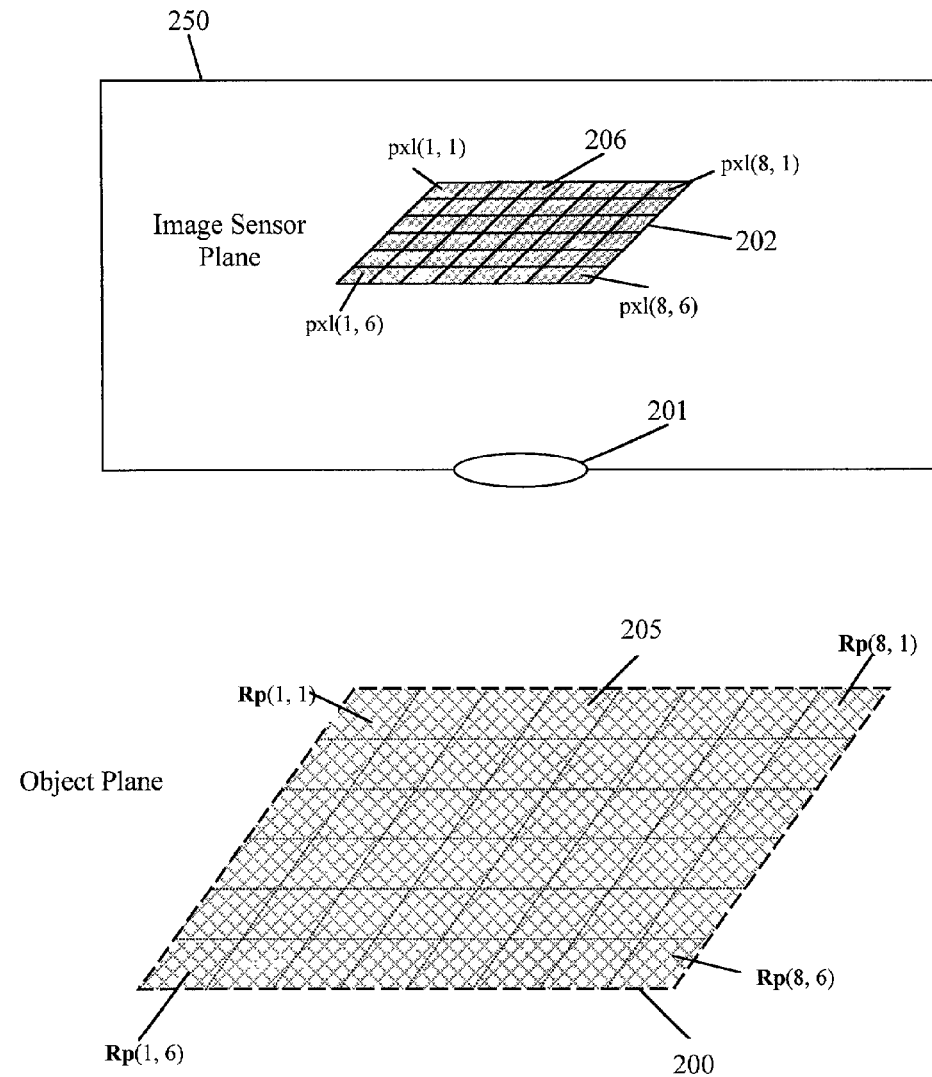
FIG. 1 is an illustration of pixel mapping of an imaging system.
Figure 2:
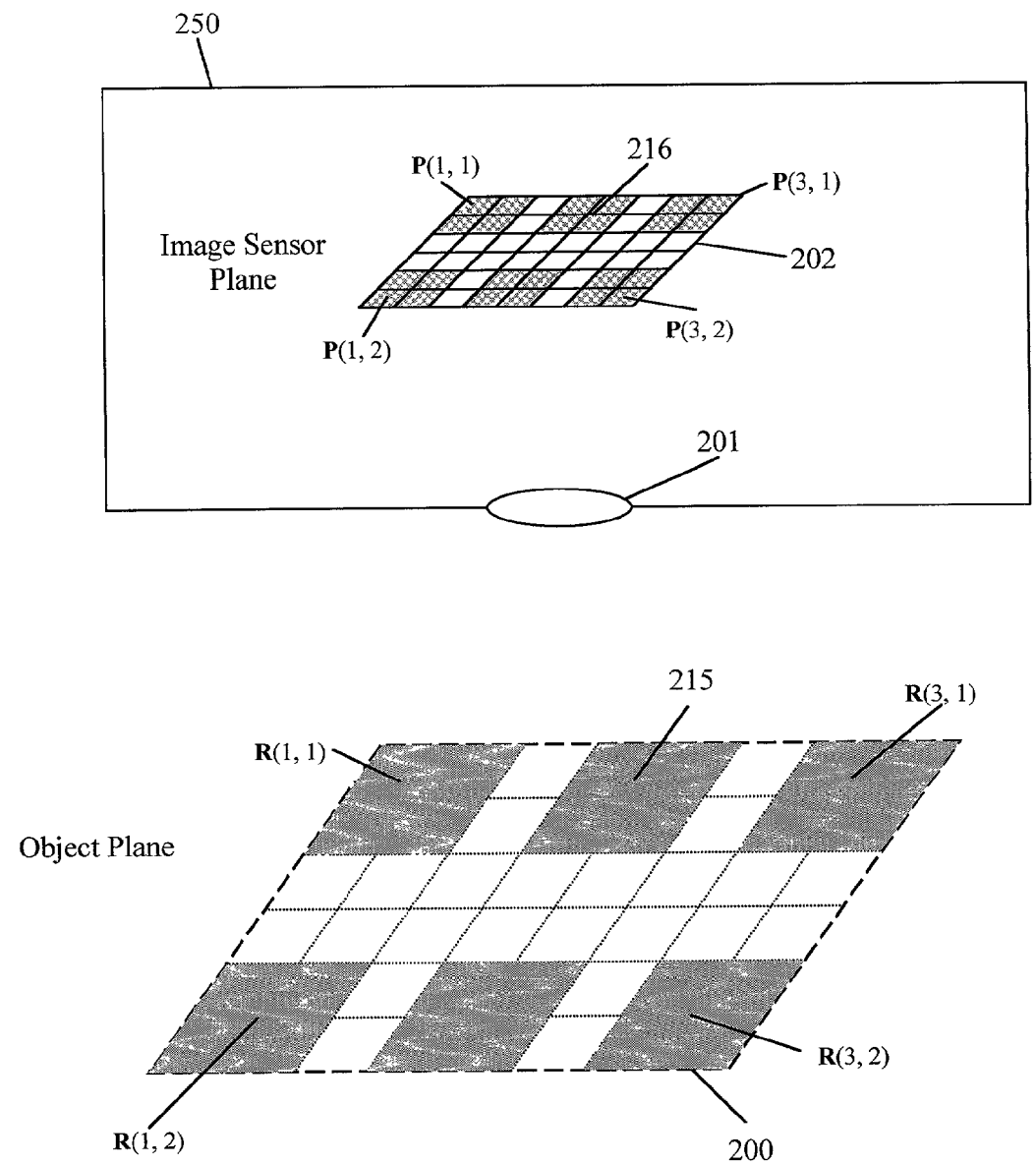
FIG. 2 is an illustration of generalized region mapping of an imaging system.
Figure 3:
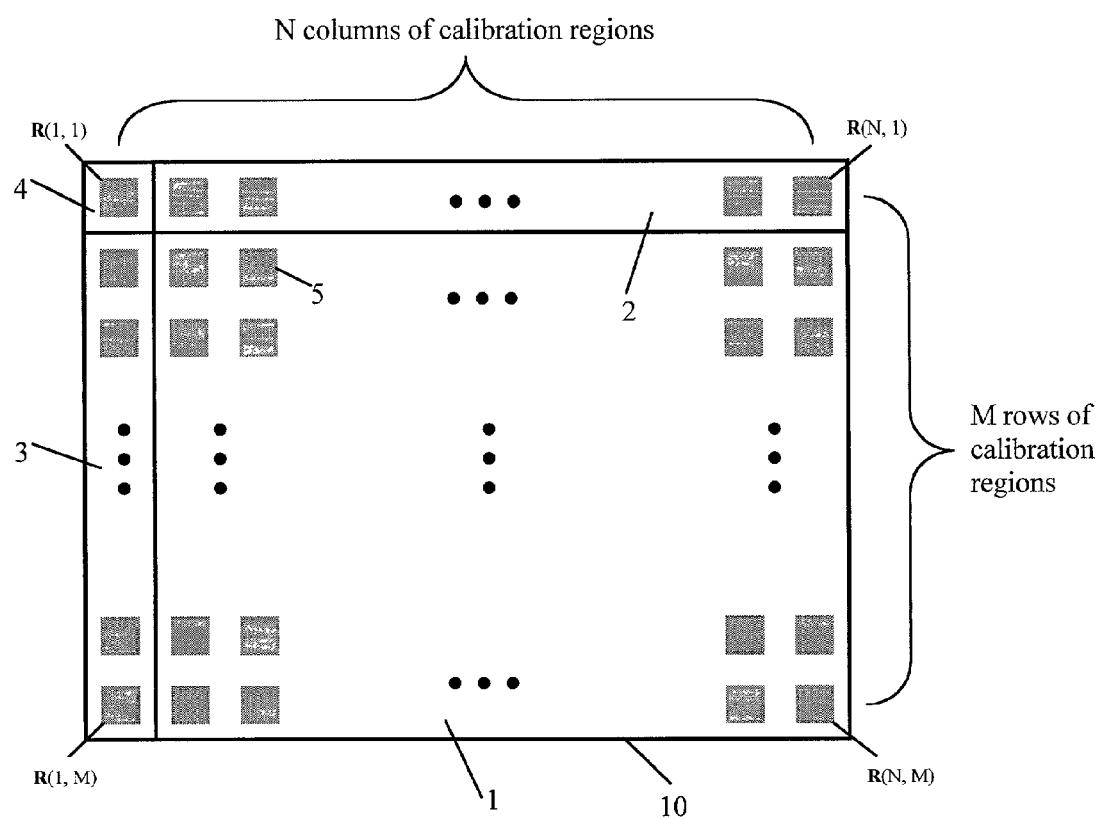
FIG. 3 is an illustration of a calibration standard with a top-left configuration.

The present invention provides a method for calculating shading correction coefficients for an imaging system, using a calibration standard with N×M regions. Reference is first made to FIG. 3, which illustrates a first calibration standard 10 according to the present invention. The described calibration standard 10 consists of N×M (N columns and M rows) calibration regions 5, which are referred to as R(x, y). Calibration standard 10 is divided into four parts. The variables x and y are the array index. x takes values form 1 to N, denoted as x=1, . . . , N, and y takes values from 1 to M, denoted as y=1, . . . , M. The top-left corner 4 consists of one calibration region 5 at its center; the top-row part 2 consists of N−1 calibration regions 5; the left-column part 3 consists of M−1 calibration regions 5, and bottom-right part 1 consists of (N−1)×(M−1) calibration regions 5. In this exemplary embodiment, N>1 and M>1. This is referred to as the 2D (2-dimensional) case. In the 2D case, both N and M have to be greater than one. If either N or M is equal to one, it becomes a one dimensional case, which is described later later.

The location of part 4 (i.e., the part with one calibration region R(1, 1)) of calibration standard 10 is used to name the configuration of the calibration standard. The calibration standard shown in FIG. 3 has a top-left configuration, and the arrangement of the four parts shown in FIG. 3 is the initial setup of the top-left configuration.

Calibration standard 10 is imaged by an imaging system and a shading correction coefficient for each region 5 is calculated according to the present invention. The shading correction coefficients for regions 5 will depend on the object being imaged and the particular characteristic being imaged. For example, a fluorescent object may be imaged to determine the amount of excited light from the object. Subsequently, the same imaging system may be used to image an illuminant object to determine the amount of self-emitted light. In these two different cases, the shading correction coefficients may be different, even for comparable regions of the imaging field. In the first case, the shading error is due to the inhomogenity of the lens, the excitation light source, sensor and other electronic sources. In the second case, the shading error is due to the inhomogenity of the lens, sensor and other electronic sources (there is no excitation light source).

It is preferable that the material in each calibration region 5 is the same or has characteristics similar to the object which will ultimately be imaged. For example, the same fluorescent material is preferably deposited on the calibration regions 5 if the object to be imaged is fluorescent. However, unlike the prior art, it is not necessary that the densities or concentrations of the deposited material in regions 5 of calibration standard 10 are the same and the differences between regions do not need to be known.

The physical shape of the calibration regions 5 can be in any form. The square shape shown in the Figures is for illustration purpose only. Also, the gaps between calibration regions 5 are for the purpose of illustration only. Their physical presence is not required. Also, the central placement of calibration regions 5 in parts 1, 2, 3 and 4 are for the illustration purpose only. Their placement could be off the center as long as the region intervals remain uniform.

The signal intensity of region R(x, y) is denoted as VC(x, y). In the case of illuminant calibration standards, the signal intensity is the emitted light intensity. In the case of fluorescent calibration standards, the signal intensity is the excited light intensity under uniform illumination since the illumination inhomogenity is already incorporated into the shading error. The signal intensity VC(x, y) of a particular region R(x, y) should remain constant during the calibration process described below.

Figure 4:
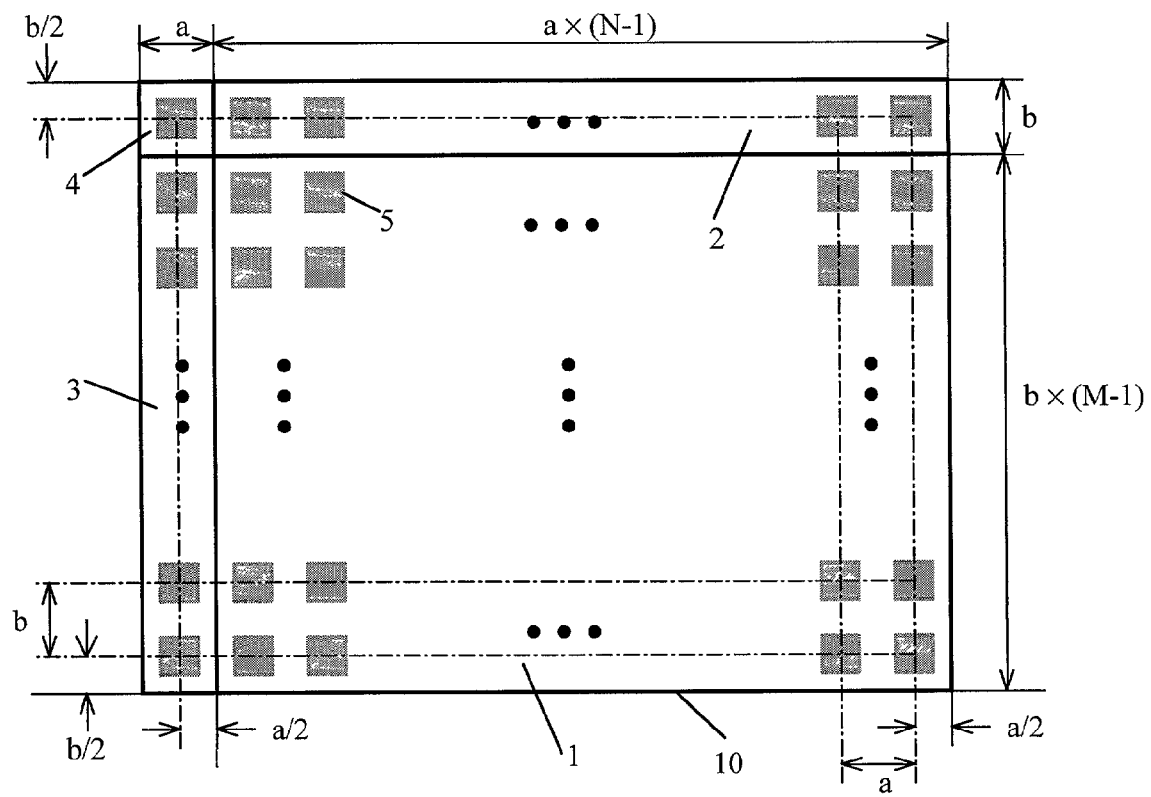
FIG. 4 shows the dimensions of the calibration standard in FIG. 3.

The dimensions of the calibration standard 10 are shown in FIG. 4, in which "a" is the horizontal interval of regions 5 and "b" is the vertical interval of regions 5. Preferably, all the calibration regions 5 should be within the field of view of the imaging system. Also, preferably, the spatial dimension of the calibration standard 10 should be equal to that of the field of view of the imaging system to be calibrated. That is:

$$W_{FOV} = a \times N \text{ and } H_{FOV} = b \times M$$

where: $W_{FOV}$ and $H_{FOV}$ are the width and the height of the field of view of the imaging system to be calibrated.

The selections of a, b, N, M and the shape of the calibration regions 5 are determined by requirements of a particular application of the present invention. Where a large variation in shading errors is expected, a and b may be selected to be small and consequently N and M (assuming a fixed field of view) will be large. That is, the regions 5 are spaced more closely together.

When the calibration standard shown in FIG. 3 is imaged in an imaging system, the imaging intensity $IC^O(x, y)$ of the region R(x, y) is defined by the following equation:

$$IC^O(x, y) = G \times SE(x, y) \times VC(x, y) \qquad \text{EQ. 4}$$

for x=1, . . . , N and y=1, . . . , M where: G is a constant representing the imaging system gain.

Taking a natural log transform on both side of EQ. 4, we obtained:

$$IC_L^O(x, y) = G_L + SE_L(x, y) + VC_L(x, y) \qquad \text{EQ. 5}$$

for x=1, . . . , N and y=1, . . . , M where:

$$IC_L^O(x, y) = ln(IC^O(x, y))$$

$$SE_L(x, y) = ln(SE(x, y))$$

$$VC_L(x, y) = ln(VC(x, y))$$

$$G_L = ln(G)$$

ln(d) is the natural log of number d.

Figure 5:
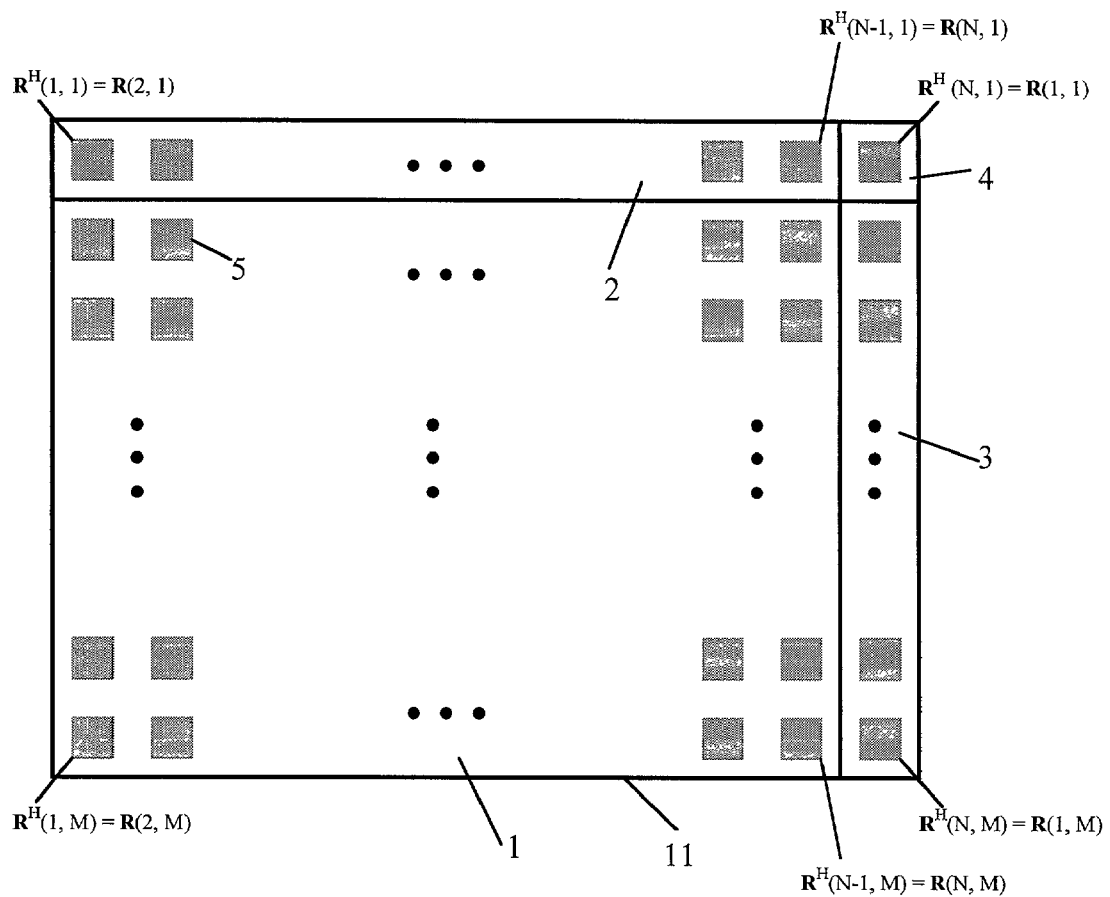
FIG. 5 is an illustration of a horizontally shifted-and-rotated arrangement of the calibration standard of FIG. 3.

FIG. 5 shows a horizontally shifted-and-rotated arrangement 11 of the top-left configuration of calibration standard 10 (FIGS. 3 and 4). The horizontal shift-and-rotation is done by shifting the entire calibration standard 10 to the left by one column and then moving parts 3 and 4 to the right of parts 1 and 2. The re-arranged calibration regions 5 are referred to as $R^H(x, y)$, and the relationship between the contents (calibration materials) of $R^H(x, y)$ and R(x, y) is defined as:

$$Content(R^H(x, y)) = Content(R(Mod(x+1, N), y)) \qquad \text{EQ. 6}$$

for x=1, . . ., N and y=1, . . ., M

The function Mod (q, d) in EQ. 6 and subsequent equations is defined as:

$$Mod(q, d) = \begin{cases} (q + m \times d - 1) \% d + 1 & \text{if } q \text{ and } d \text{ are integers and } q < 1 \text{ and } d \geq 1 \\ (q - 1) \% d + 1 & \text{if } q \text{ and } d \text{ are integers and } q \geq 1 \text{ and } d \geq 1 \\ \text{Invalid} & \text{Otherwise} \end{cases}$$

where: % is a remainder operator (e.g., 1%3=10%3=1).

Given integer q and d, m is the smallest positive integer such that $q + m \times d \geq 1$.

Figure 6:
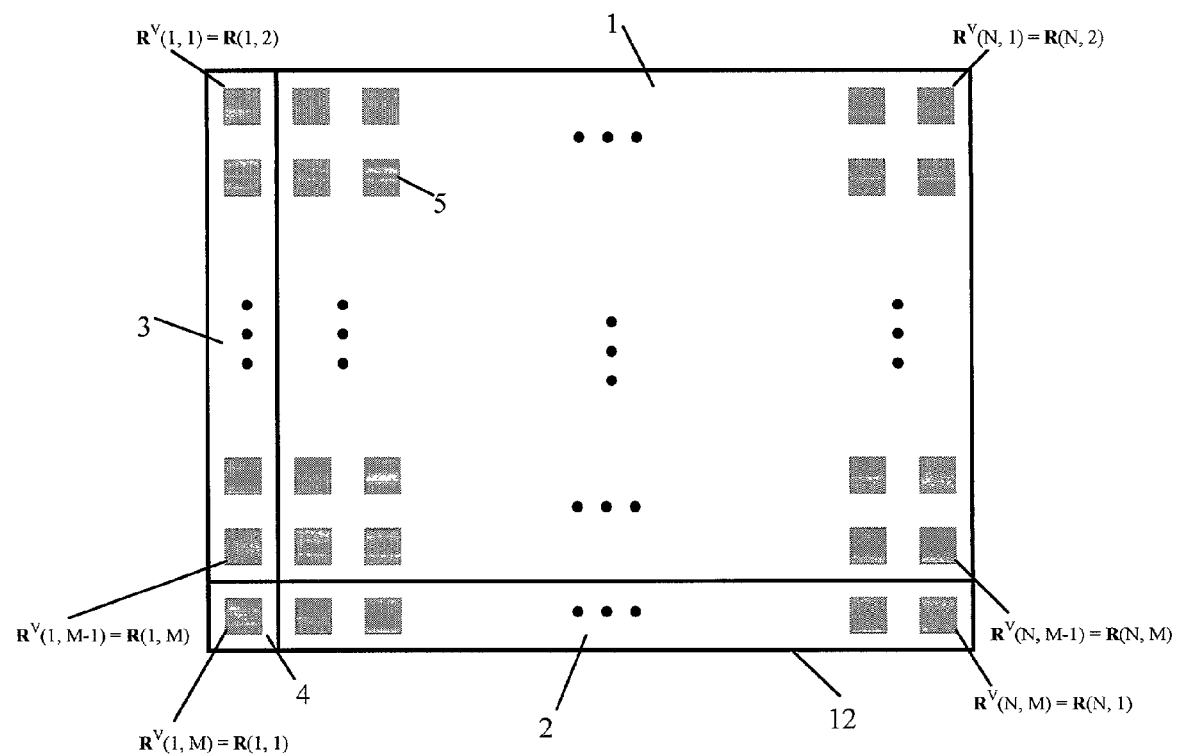
FIG. 6 is an illustration of a vertically shifted-and-rotated arrangement of the calibration standard of FIG. 3.

FIG. 6 shows a vertically shifted-and-rotated arrangement 12 of the top-left configuration of calibration standard 10 (FIGS. 3 and 4). The vertical shift-and-rotation is done by shifting the entire calibration standard 10 up by one row and then moving parts 2 and 4 to the bottom of parts 1 and 3. The re-arranged calibration regions 5 are referred to as $R^V(x, y)$, and the relationship between the contents of $R^V(x, y)$ and $R(x, y)$ is defined as:

$$\text{Content}(R^V(x, y)) = \text{Content}(R(x, \text{Mod}(y+1, M))) \quad \text{EQ. 7}$$

for x=1, ..., N and y=1, ..., M

According to the present invention, the re-arranged calibration regions 5 of the shifted-and-rotated arrangements 11 and 12 are physically aligned to the calibration regions 5 in the initial setup of calibration standard 10. That is:

$$P(x, y) = P^H(x, y) = P^V(x, y) \quad \text{RQ. 1}$$

for x=1, ..., N and y=1, ..., M where: $P(x, y)$, $P^H(x, y)$, and $P^V(x, y)$ are the mapped pixel sets of calibration regions $R(x, y)$ (FIG. 3), $R^H(x, y)$ (FIG. 4) and $R^V(x, y)$ (FIG. 5) respectively.

Let $IC_L^H(x, y)$ be the natural log transformed image intensity of the region $R^H(x, y)$ for the horizontally shifted-and-rotated arrangement 11 shown in FIG. 5. From RQ. 1, we know that the region $R(x, y)$ and the region $R^H(x, y)$ map to the same pixels. Therefore, they share the same shading error $SE(x, y)$. From EQ. 6, we further know that the content of region $R^H(x, y)$ is the content of region $R(\text{Mod}(x+1, N), y)$, i.e., the signal intensity of calibration region $R^H(x, y)$ is $VC(\text{Mod}(x+1, N), y)$. Therefore, we have:

$$IC_L^H(x, y) = G_L + SE_L(x, y) + VC_L(\text{Mod}(x+1, N), y) \quad \text{EQ. 8}$$

for x=1, ..., N and y=1, ..., M

Let $IC_L^V(x, y)$ be the natural log transformed image intensity of the region $R^V(x, y)$ for the vertically shifted-and-rotated arrangement 12 shown in FIG. 6. Similar to the deduction of EQ. 8 from EQ. 7 and RQ. 1, we have:

$$IC_L^V(x, y) = G_L + SE_L(x, y) + VC_L(x, \text{Mod}(y+1, M)) \quad \text{EQ. 9}$$

for x=1, ..., N and y=1, ..., M

Multiplying 2 to both sides of EQ. 5, multiplying−1 to both sides of EQ. 8 and EQ. 9, and then adding the three new equations together, i.e., 2×(EQ. 5)−(EQ. 8)−(EQ. 9), we have:

$$ICV(x, y) = 2 \times VC_L(x, y) - VC_L(\text{Mod}(x+1, N), y) - VC_L(x, \text{Mod}(y+1, M)) \quad \text{EQ. 10}$$

for x=1, ..., N and y=1, ..., M where:

$$ICV(x, y) = 2 \times IC_L^O(x, y) - IC_L^H(x, y) - IC_L^V(x, y)$$

Using EQ. 5, we can obtain the following relationship:

$$VC_L(x, y) = IC_L^O(x, y) - G_L - SE_L(x, y)$$

$$VC_L(\text{Mod}(x+1, N), y) = IC_L^O(\text{Mod}(x+1, N), y) - G_L - SE_L(\text{Mod}(x+1, N), y)$$

$$VC_L(x, \text{Mod}(y+1, M)) = IC_L^O(x, \text{Mod}(y+1, M)) - G_L - SE_L(x, \text{Mod}(y+1, M))$$

Substituting $VC_L(x, y)$, $VC_L(\text{Mod}(x+1, N), y)$ and $VC_L(x, \text{Mod}(y+1, M))$ in EQ. 10 with the above relationship provides EQ. 11:

$$ICS(x, y) = 2 \times SE_L(x, y) - SE_L(\text{Mod}(x+1, N), y) - SE_L(x, \text{Mod}(y+1, M)) \quad \text{EQ. 11}$$

for x=1, ..., N and y=1, ..., M where:

$$ICS(x, y) = IC_L^H(x, y) + IC_L^V(x, y) - IC_L^O(\text{Mod}(x+1, N), y) - IC_L^O(x, \text{Mod}(y++1, M))$$

If we order the two dimensional index (x, y) in EQ. 11 by the column first method, i.e., (1, 1), (2, 1), ..., (N, 1), (1, 2), (2, 2), ..., (N, 2), ..., (1, M), (2, M), ..., (N, M), we can represent EQ. 11 in a matrix representation, as defined in EQ. 12.

$$ICS = A \, SE_L \quad \text{EQ. 12}$$

where: A is a (N×M)×(N×M) matrix, i.e., it has N×M rows and N×M columns. It can be represented by a partitioned matrix, as defined below. The matrix E is a N×N matrix as defined below, the matrix I is a N×N identity matrix and matrix 0 is a N×N zero matrix (all coefficients are 0).

$$A = \begin{bmatrix} E & -I & 0 & . & 0 & 0 & 0 \\ 0 & E & -I & . & 0 & 0 & 0 \\ 0 & 0 & E & . & 0 & 0 & 0 \\ . & . & . & . & . & . & . \\ 0 & 0 & 0 & . & E & -I & 0 \\ 0 & 0 & 0 & . & 0 & E & -I \\ -I & 0 & 0 & . & 0 & 0 & E \end{bmatrix}_{NxM \times NxM}$$

$$E = \begin{bmatrix} 2 & -1 & . & 0 & 0 \\ 0 & 2 & . & 0 & 0 \\ . & . & . & . & . \\ 0 & 0 & . & 2 & -1 \\ -1 & 0 & . & 0 & 2 \end{bmatrix}_{NxN}$$

$$I = \begin{bmatrix} 1 & 0 & . & 0 & 0 \\ 0 & 1 & . & 0 & 0 \\ . & . & . & . & . \\ 0 & 0 & . & 1 & 0 \\ 0 & 0 & . & 0 & 1 \end{bmatrix}_{NxN}$$

-continued $$ICS = \begin{bmatrix} ICS(1, 1) \\ ICS(2, 1) \\ \cdot \\ ICS(N, 1) \\ \cdot \\ \cdot \\ ICS(1, M) \\ ICS(2, M) \\ \cdot \\ ICS(N, M) \end{bmatrix}_{1 \times (N \times M)}$$

$$SE_L = \begin{bmatrix} SE_L(1, 1) \\ SE_L(2, 1) \\ \cdot \\ SE_L(N, 1) \\ \cdot \\ \cdot \\ SE_L(1, M) \\ SE_L(2, M) \\ \cdot \\ SE_L(N, M) \end{bmatrix}_{1 \times (N \times M)}$$

Using standard mathematical techniques, it can be proved that the rank of matrix A is N×M−1. Therefore the solution of $SE_L(x, y)$ is not unique. However, since the rank of matrix A is N×M−1, $SE_L(x, y)$ can be resolved by arbitrarily specifying only one of the values (e.g., $SE_L(1, 1)$ is specified).

Let SEO be a solution of EQ. 11 or EQ. 12, by giving one of the shading errors a known value. SEO can be defined as {SEO(x, y, ax, ay, K): x=1, ..., N, y=1, ..., M,
1≤ax≤N, 1≤ay≤M, K is a given value and
$SE_L(ax, ay)=K$}  DF. 1

Taking the exponential transform (inverse of the log transform) and normalization (as in EQ. 2), the corresponding shading error SE(x, y) is defined as:

$$SE(x, y) = \frac{e^{SEO(x,y,ax,ay,K)}}{\frac{1}{N \times M} \sum_{i=1}^{N} \sum_{j=1}^{M} e^{SEO(i,j,ax,ay,K)}} \qquad \text{EQ. 13}$$

for $x = 1, \ldots, N$ and $y = 1, \ldots, M$

Using standard mathematical techniques, it can be proved that the difference between any given two solutions SEO(x, y, ax1, ay1, K1) and SEO(x, y, ax2, ay2, K2) of EQ. 12 is constant, for a given set of measured image intensities ($IC_L^O(x, y)$, $IC_L^H(x, y)$ and $IC_L^V(x, y)$). That is:

SEO(x, y, ax2, ay2, K2)−SEO(x, y, ax1, ay1, K1)=F for x=1, ..., N and y=1, ..., M where: F is a constant.

This give the following equation:

$$\frac{e^{SEO(x,y,ax2,ay2,K2)}}{\frac{1}{N \times M} \sum_{i=1}^{N} \sum_{j=1}^{M} e^{SEO(i,j,ax2,ay2,K2)}} = \frac{e^{SEO(x,y,ax1,ay1,K1)+F}}{\frac{1}{N \times M} \sum_{i=1}^{N} \sum_{j=1}^{M} e^{SEO(i,j,ax1,ay1,K1)+F}}$$

$$= \frac{e^{SEO(x,y,ax1,ay1,K1)}}{\frac{1}{N \times M} \sum_{i=1}^{N} \sum_{j=1}^{M} e^{SEO(i,j,ax1,ay1,K1)}}$$

That is, the shading error SE(x, y) defined in EQ. 13 is unique, regardless of the values of ax, ay and K.

As an example, select ax=N, ay=M and K=1 as the solution for calculating the shading error. This solution is referred to as intermediate shading error and denoted as S1(x, y), i.e., S1(x, y)=SEO(x, y, N, M, 1), whose solution is defined by EQ. 14A and EQ. 14B.

$$S1(N, M) = 1 \qquad \text{EQ. 14A}$$

$$\begin{bmatrix} ICS(1, 1) \\ ICS(2, 1) \\ \cdot \\ ICS(N, 1) \\ \cdot \\ \cdot \\ ICS(N, M-1)+1 \\ ICS(1, M) \\ ICS(2, M) \\ \cdot \\ ICS(N-1, M)+1 \end{bmatrix}_{1 \times (N \times M-1)} = A1 \begin{bmatrix} S1(1, 1) \\ S1(2, 1) \\ \cdot \\ S1(N, 1) \\ \cdot \\ \cdot \\ S1(1, M) \\ S1(2, M) \\ \cdot \\ S1(N-1, M) \end{bmatrix}_{1 \times (N \times M-1)} \qquad \text{EQ. 14B}$$

where: Matrix A1 is the top-left (N×M−1)×(N×M−1) submatrix of A defined in EQ. 12. That is:

$a1_{i,j}=a_{i,j}$ for i=1, ..., N−1 and j=1, ..., M−1.

$a1_{i,j}$ and $a_{i,j}$ are the coefficient of matrix A1 and A at column i and row j respectively.

The constant "1" in the terms "ICS(N, M−1)+1" and "ICS(N, M−1)+1" results from moving the variable $SE_L(N, M)$ to the left side of the equation and $SE_L(N, M)=1$.

EQ. 14B can be solved by directly calculating the inverse matrix $A1^{-1}$, as defined in EQ. 15. It can also be solved by standard iterative methods.

$$\begin{bmatrix} S1(1, 1) \\ S1(2, 1) \\ \cdot \\ S1(N, 1) \\ \cdot \\ \cdot \\ S1(1, M) \\ S1(2, M) \\ \cdot \\ S1(N-1, M) \end{bmatrix}_{1 \times (N \times M-1)} = A1^{-1} \begin{bmatrix} ICS(1, 1) \\ ICS(2, 1) \\ \cdot \\ ICS(N, 1) \\ \cdot \\ \cdot \\ ICS(N, M-1)+1 \\ ICS(1, M) \\ ICS(2, M) \\ \cdot \\ ICS(N-1, M)+1 \end{bmatrix}_{1 \times (N \times M-1)} \qquad \text{EQ. 15}$$

The shading error SE(x, y) can then be calculated from the intermediate shading error by EQ. 16:

$$SE(x, y) = \frac{e^{SI(x,y)}}{\frac{1}{N \times M} \sum_{i=1}^{N} \sum_{j=1}^{M} e^{SI(i,j)}}$$ EQ. 16 for $x = 1, \ldots, N$ and $y = 1, \ldots, M$

Once shading error $SE(x, y)$ is determined, the shading correction coefficients $SC(x, y)$ can be determined from EQ. 3.

Figure 7:
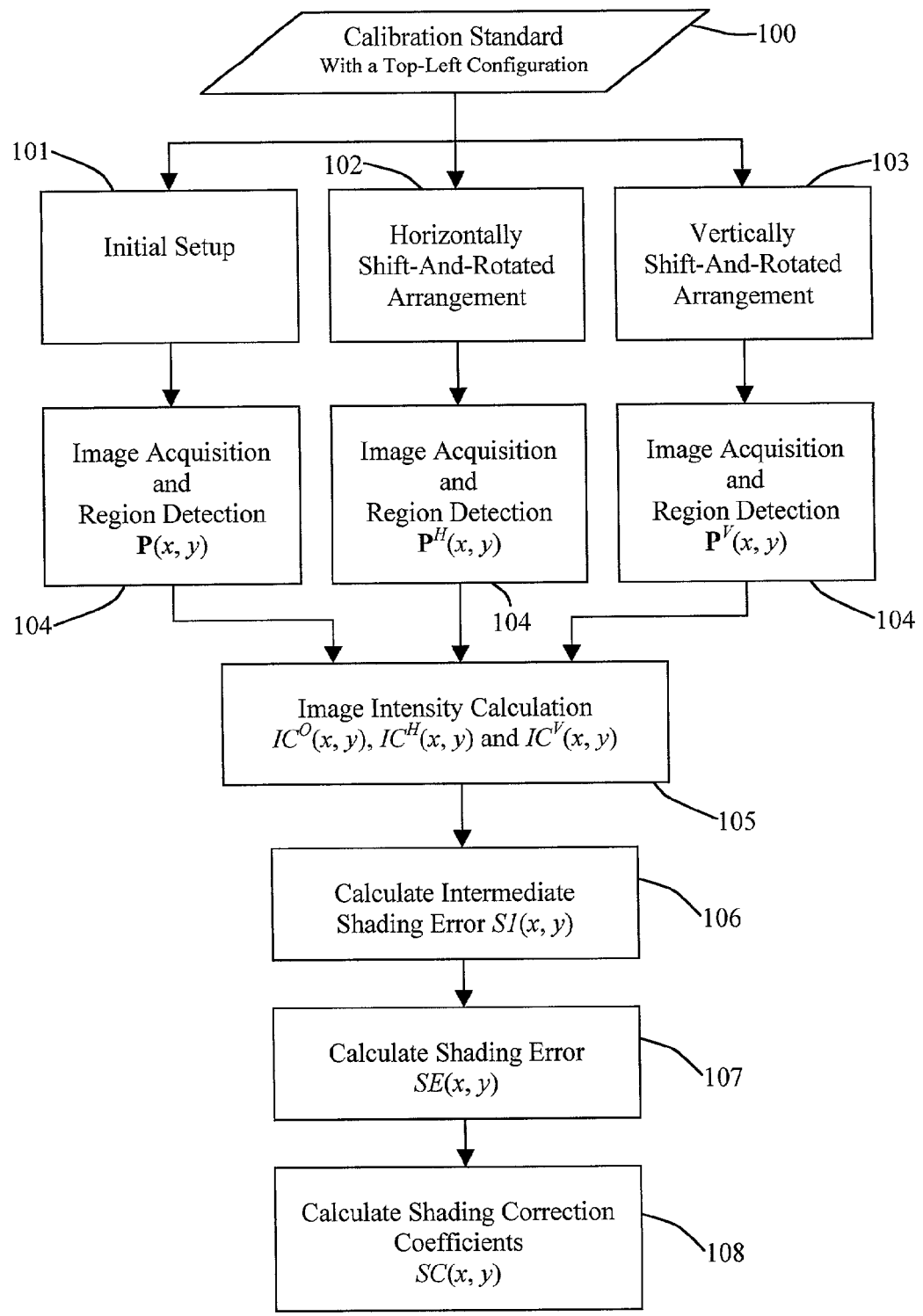
FIG. 7 is a flowchart illustrating procedures for establishing shading correction coefficients of an imaging system using the calibration standard of FIG. 4.

FIG. 7 summarizes the shading correction coefficient calculation. A calibration standard 10 with a top-left configuration is present to an imaging system to be calibrated. Step 101 utilizes the calibration standard 10 in its initial setup as illustrated in FIG. 3. Step 102 manipulates calibration standard 10 to form a horizontally shifted-and-rotated arrangement 11 (FIG. 5). Step 103 manipulates the standard to form the vertically shifted-and-rotated arrangement 12 (FIG. 6). In step 104, images are taken of initial setup of calibration standard 10, shifted-and-rotated arrangement 11 and shifted-and-rotated arrangement 12, and the pixel sets $P(x, y)$, $P^H(x, y)$ and $P^V(x, y)$ of the corresponding calibration regions $R(x, y)$, $R^H(x, y)$ and $R^V(x, y)$ are determined using standard image processing algorithms. Step 105 calculates the image intensity $IC^O(x, y)$, $IC^H(x, y)$ and $IC^V(x, y)$ from the pixel sets $P(x, y)$, $P^H(x, y)$ and $P^V(x, y)$ and the acquired images. Step 106 calculates the intermediate shading error $S1(x, y)$ from EQ. 14A and EQ. 14B. Step 107 calculates the shading error $SE(x, y)$ from the intermediate shading error $S1(x, y)$, by EQ. 16. Finally, step 108 calculates the shading correction coefficient $SC(x, y)$ from $SE(x, y)$ by EQ. 3.

The region signal intensity $VC(x, y)$ can also be determined from EQ. 4, if the gain of the imaging system is known. That is:

$$VC(x, y) = \frac{IC^0(x, y)}{G \times SE(x, y)}$$ EQ. 17

If only the relative region signal intensity ($VC_R(x, y)$) is required, it can be calculated without knowledge of the system gain. That is:

$$VC_R(x, y) = \frac{IC^0(x, y)/SE(x, y)}{\frac{1}{N \times M} \sum_{i=1}^{N} \sum_{j=1}^{M} IC^0(i, j)/SE(i, j)}$$ EQ. 18

Figure 8:
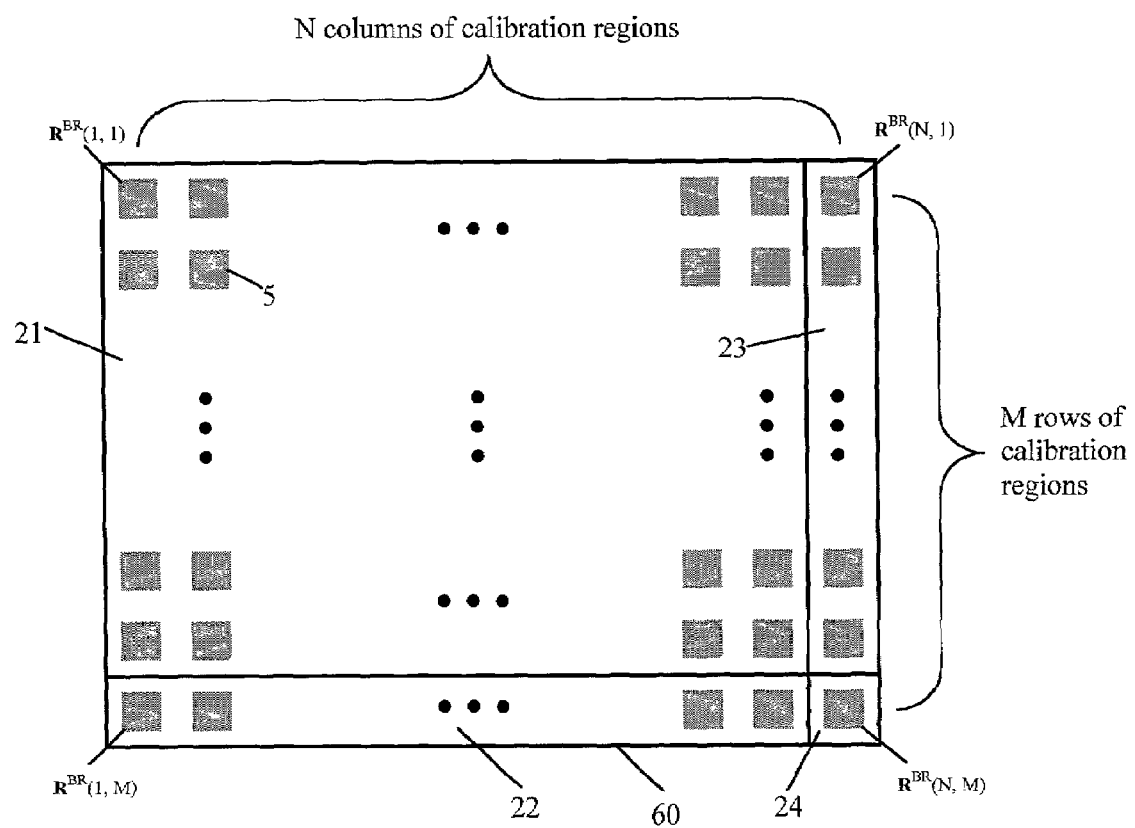
FIG. 8 is an illustration of a calibration standard with a bottom-right configuration.

FIG. 3 shows calibration standard 10 which has a top-left configuration. There are many other configurations that can be used to calculate shading errors and the region signal intensities. For example, FIG. 8 shows a calibration standard 60 with a bottom-right configuration. As with the top-left calibration standard 10 described in relation to FIG. 3, this bottom-right calibration standard 60 has four detachable parts with N×M uniformly arranged calibration regions 5. The bottom-right corner 24 consists of one calibration region 5 at the center; the bottom-row part 22 consists of N−1 calibration regions 5; the right-column part 23 consists of M−1 calibration regions 5, and the part 21 consists of (N−1)×(M−1) calibration regions 5. The calibration regions 5 are referred to as $R^{BR}(x, y)$.

Figure 9:
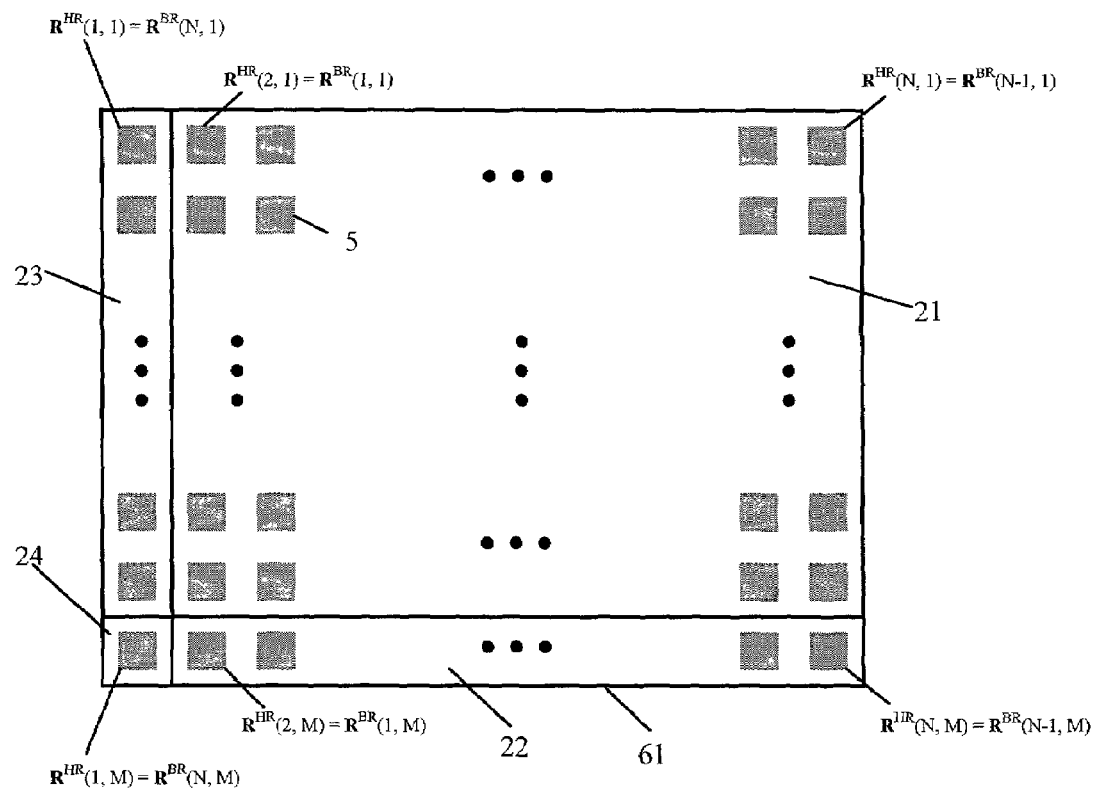
FIG. 9 is an illustration of a horizontally shifted-and-rotated arrangement of the calibration standard of FIG. 8.

FIG. 9 shows a horizontally shifted-and-rotated arrangement 61 of the bottom-right calibration standard 60. The shift-and-rotation is done by shifting the entire calibration standard 60 (in FIG. 8) to right by one column and then moving the part 23 and 24 to the left of part 21 and 22. The re-arranged calibration regions 5 are referred to as $P^{HR}(x, y)$, and:

Content($R^{HR}(x, y)$)=Content ($R^{BR}$(Mod($x$−1, N), $y$)) EQ. 19 for x=1, ..., N and y=1, ..., M

Figure 10:
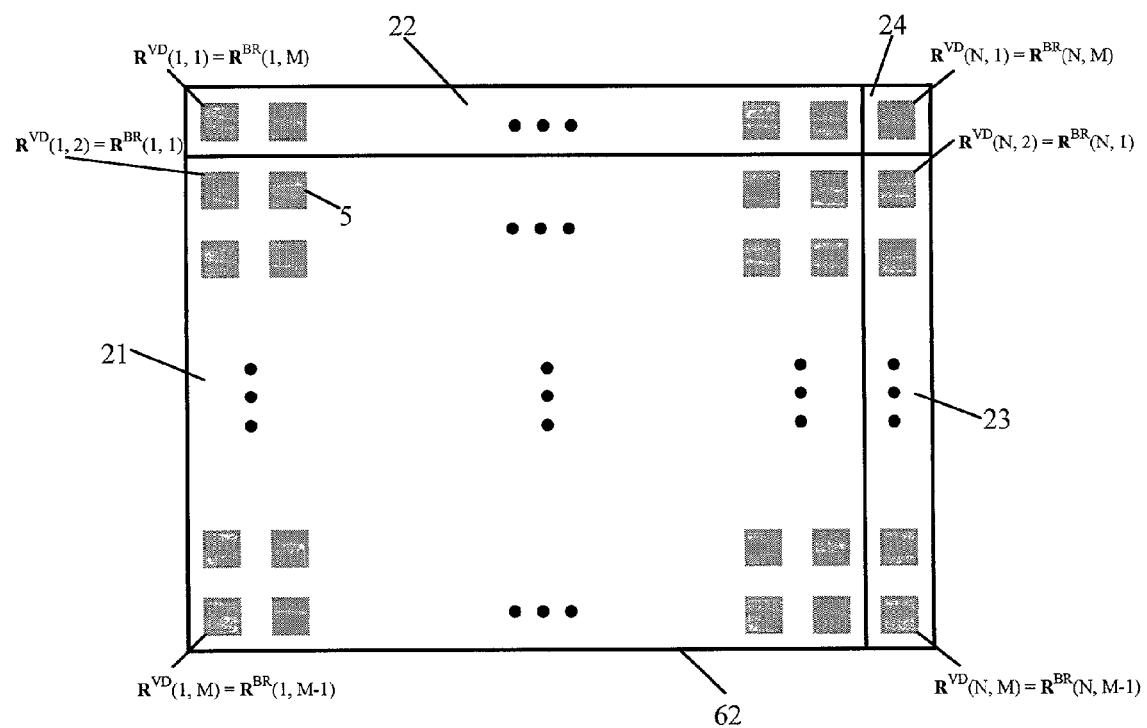
FIG. 10 is an illustration of a vertically shifted-and-rotated arrangement of the calibration standard of FIG. 8.

FIG. 10 shows a vertically shifted-and-rotated arrangement 62 of the bottom-right calibration standard 60. The shift-and-rotation is done by shifting the entire calibration standard 60 (in FIG. 8) down by one row and then moving the part 22 and 24 to the top of part 21 and 23. The re-arranged calibration regions 5 are referred to as $P^{VD}(x, y)$, and:

Content($R^{VD}(x, y)$)=Content($R^{BR}(x,$ Mod($y$−1, M))) EQ. 20 for x=1, ..., N and y=1, ..., M $P^{BR}(x, y)$, $P^{HR}(x, y)$ and $P^{VD}(x, y)$ are the pixel sets corresponding to regions $R^{BR}(x, y)$, $R^{HR}(x, y)$ and $R^{VD}(x, y)$ respectively. Similar to the top-left configuration, it is required that the re-arranged calibration regions of the horizontally and vertically shifted-and-rotated arrangements 61 and 62 are aligned to the regions in the initial calibration standard 60. That is:

$$P^{BR}(x, y)=P^{HR}(x, y)=P^{VD}(x, y)$$ RQ. 2 for x=1, ..., N and y=1, ..., M

Similar to the deduction of EQ. 11, the equation for the shading error $SE_L(x, y)$ of the bottom-right calibration standard 60 is:

$ICS_{BR}(x, y)=2\times SE_L(x, y)-SE_L$(Mod($x$−1, N), $y$)−$SE_L(x,$ Mod($y$−1, M)) EQ. 21 for x=1, ..., N and y=1, ..., M where:

$ICS_{BR}(x, y)=IC_L^{HR}(x, y)+IC_L^{VD}(x, y)-IC_L^{BR}$(Mod($x$−1, N), $y$)−$IC_L^{BR}(x,$ Mod($y$−1, M))

$IC_L^{BR}(x, y)$ is the log transformed image intensity of the region $R^{BR}(x, y)$ shown in FIG. 8;

$IC_L^{HR}(x, y)$ is the log transformed image intensity of the region $R^{HR}(x, y)$ shown in FIG. 9; and $IC_L^{VD}(x, y)$ is the log transformed image intensity of the region $R^{VD}(x, y)$ shown in FIG. 10.

Similar to the deduction of EQ. 12 (the matrix form of EQ. 11), the matrix form of EQ. 21 can be easily deduced. EQ. 21 has the same properties as those of EQ. 11, and the procedure for solving EQ. 21 is exactly the same as that for solving EQ. 11, except the coefficients of the matrix corresponding to EQ. 21 is different than those in EQ. 12.

In the previous discussion, the solution of shading error $SE(x, y)$ from a top-left or a bottom-right calibration standard is derived from the image intensities of the initial calibration standard (10 or 60), a horizontally shifted-and-rotated arrangement (11 or 61) and the vertically shifted-and-rotated arrangement (12 or 62). There are other configurations and arrangements, which can be used to derive the shading error $SE(x, y)$ for an imaging system.

Figure 11:
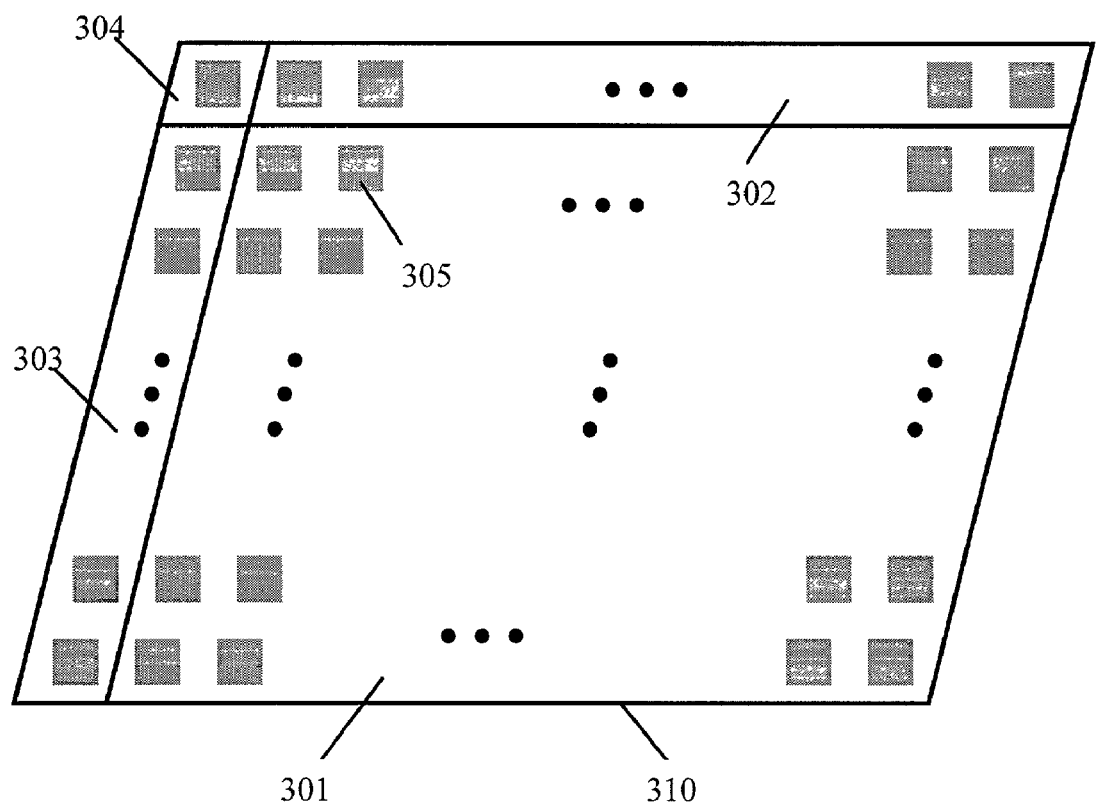
FIG. 11 is an illustration of a calibration standard with parallelogram form.

Reference is next made to FIG. 11. In the previous discussion, the calibration standards (10 and 60) presented are rectangular. Calibration standards may be in other forms as well. For example, calibration standard 310 is a parallelogram. Calibration standard 310 has four parts 301, 302, 303 and 304. Each part has a number of calibration regions 305. In fact, a calibration standard can be of any form as long as the calibration regions of shifted-and-rotated arrangements can be aligned with the regions of the initial calibration standard.

Figure 12:
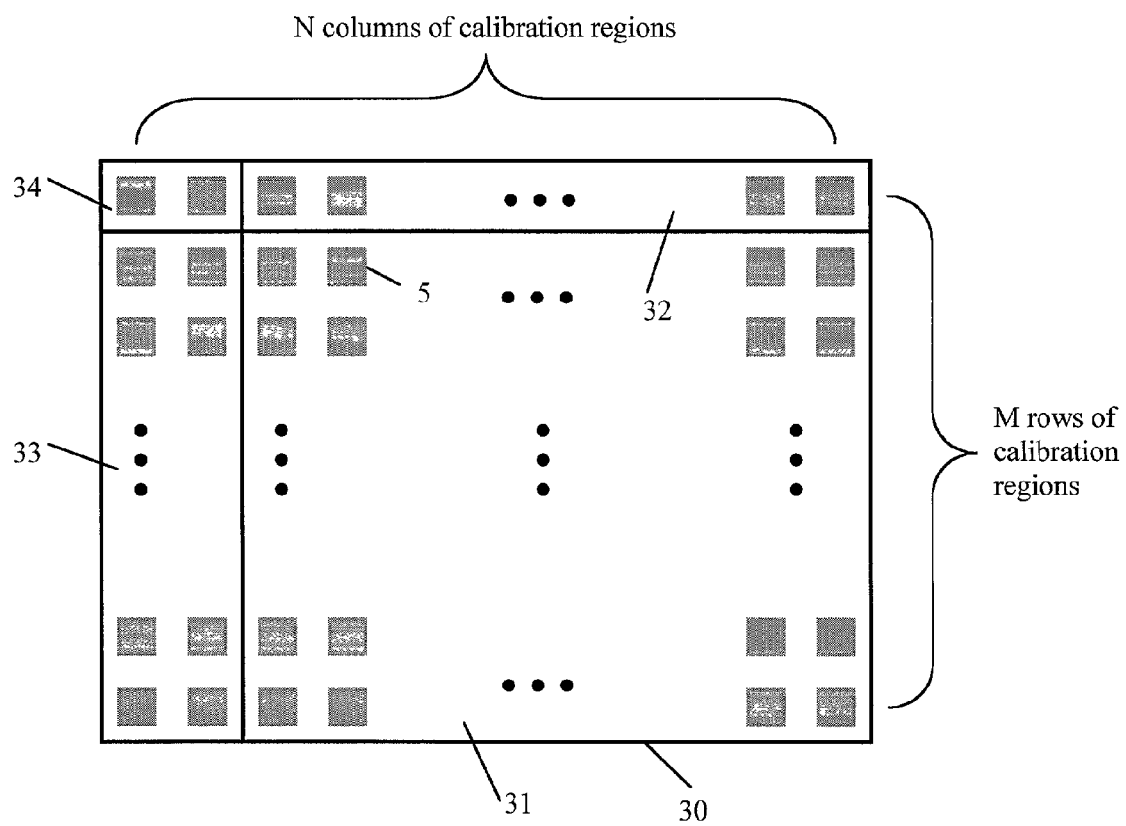
FIG. 12 is an illustration of a calibration standard with a top-left configuration and with two calibration regions in a corner part.

The corner part (e.g., part 4 in FIG. 3) of calibration standard 10 (FIG. 3) consists of only one calibration region 5. Referring to FIG. 12, a calibration standard may alternatively have more than one region in the corner part. FIG. 12 shows a calibration standard 30 with a top-left configuration and with 2 calibration regions in the corner part 34. The top-row part 32 consists of N-2 calibration regions; the left-column part 33 consists of 2×(M−1) calibration regions, and bottom-right part 31 consists of (N-2)×(M−1) calibration regions. The horizontally shifted-and-rotated arrangement corresponding to calibration standard 30 will require shifting TWO columns. Similar to the deduction of EQ. 11, we can also derive an equation to solve the shading error SE(x, y) from the image intensities of the initial calibration standard, a horizontally shifted-and-rotated arrangement, and a vertically shifted-and-rotated arrangement. However, unlike EQ. 11, solving this equation requires specifying TWO values of SE(x, y), e.g., SE(1, 1) and SE(2, 1) are given. Therefore, more than one initial value of the shading error SE(x, y) needs to be defined if the corner parts of a calibration standard consists of more than one calibration region. In order to obtain the correct shading correction coefficients for an imaging system using a calibration standard 30, the ratio of the shading errors for the two specified regions must be known a priori.

Figure 13:
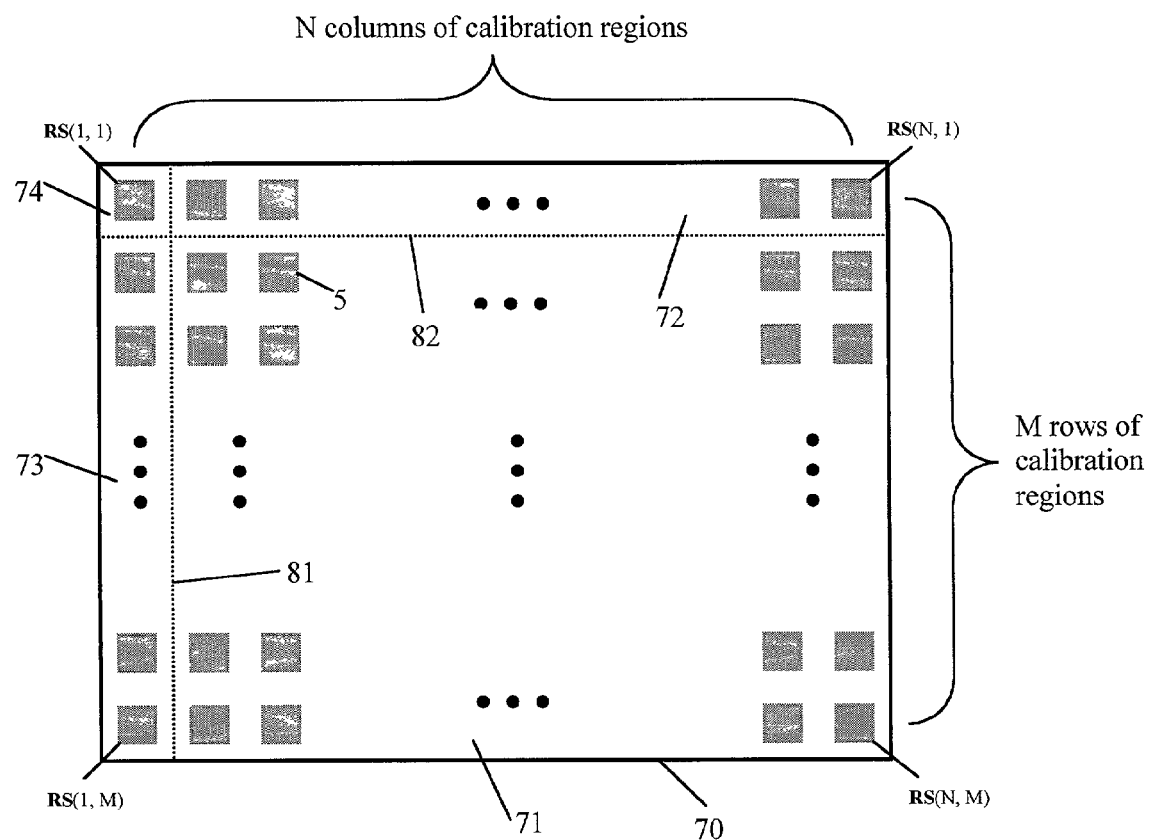
FIG. 13 is an illustration of calibration standard with a top-left configuration, but which cannot be disassembled.

In certain applications, fabrication of a physically detachable calibration standard may not be convenient or possible. In this case, the shift-and-rotation can be achieved by performing two shifts of a calibration standard. FIG. 13 shows calibration standard 70 with N×M calibration regions RS(x, y) with an imaginary top-left configuration. The dotted lines 81 and 82 in FIG. 13 represent the imaginary divisions to the standard 70 into a top-left configuration, and imaginary parts 71, 72, 73 and 74 correspond to part 1, 2, 3 and 4 in FIG. 3. It is to be noted that the use of the word "imaginary" here indicates only that calibration standard 70 cannot be conveniently detached to separate parts 71, 72, 73 and 74.

Figure 14:
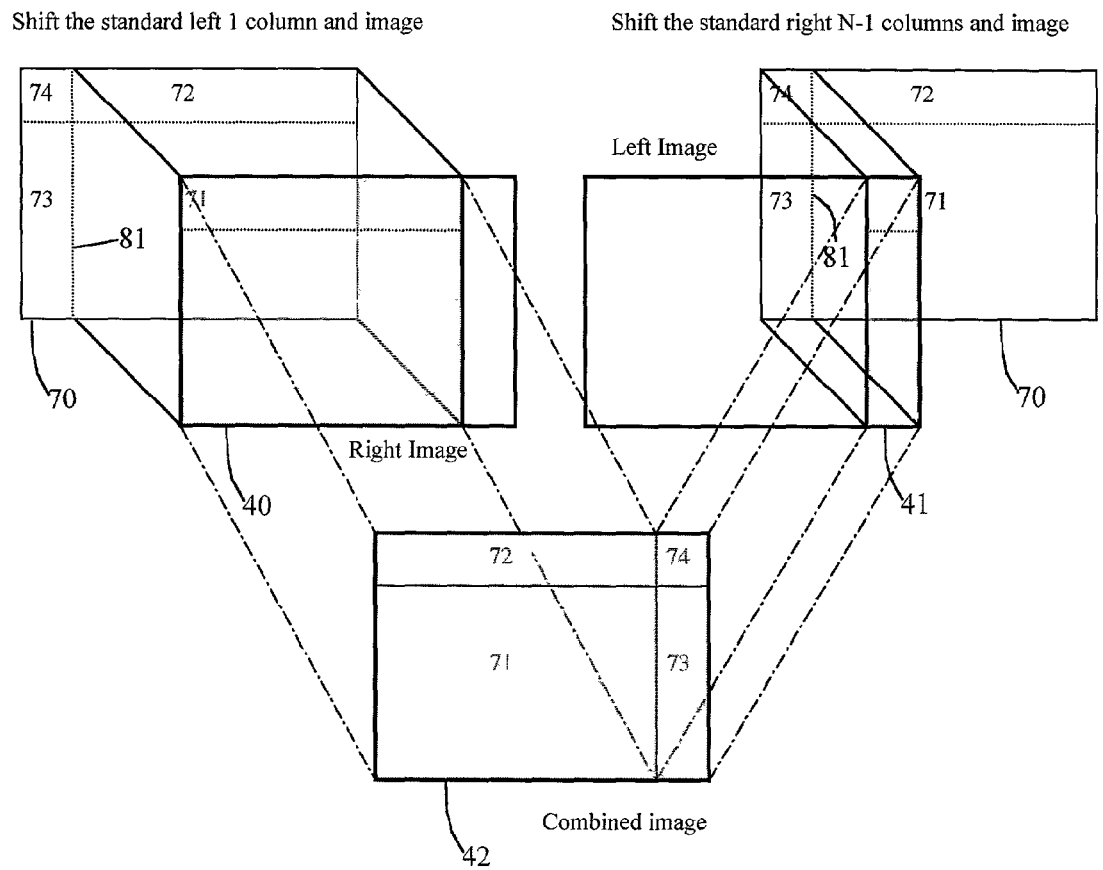
FIG. 14 illustrates a method of performing two shifts to imitate a horizontally shifted-and-rotated arrangement of the calibration standard of FIG. 13.

FIG. 14 shows the process to obtain the image of a horizontally shifted-and-rotated arrangement 42 of calibration standard 70 (FIG. 13).

First, calibration standard 70 is shifted to the left by 1 column so that line 81 is aligned with the left edge of the image of calibration standard 70 in its original position. Image 40 is acquired with calibration standard 70 in this position. The shaded area of image 40 contains regions in the imaginary parts 71 and 72 of calibration standard 70.

Second, calibration standard 70 is shifted to the right by N−1 column (relative to its original position) so that line 81 is aligned with the right edge of the image of calibration standard 70 in its original position. Image 41 is acquired with calibration standard 70 in this position. The shaded area of image 41 contains regions in the imaginary parts 73 and 74 of calibration standard 70.

Finally, images 40 and 41 are combined to form horizontally shifted-and-rotated arrangement 42. Areas 71 and 72 in horizontally shifted-and-rotated arrangement 42 are copied from the corresponding areas in image 40, and areas 73 and 74 in horizontally shifted-and-rotated arrangement 42 are copied from the corresponding areas in image 41. The combined horizontally shifted-and-rotated arrangement 42 is essentially the same as if calibration standard 70 had been detached along line 81 and then re-assembled in a horizontally shifted-and-rotated arrangement and then imaged.

Figure 15:
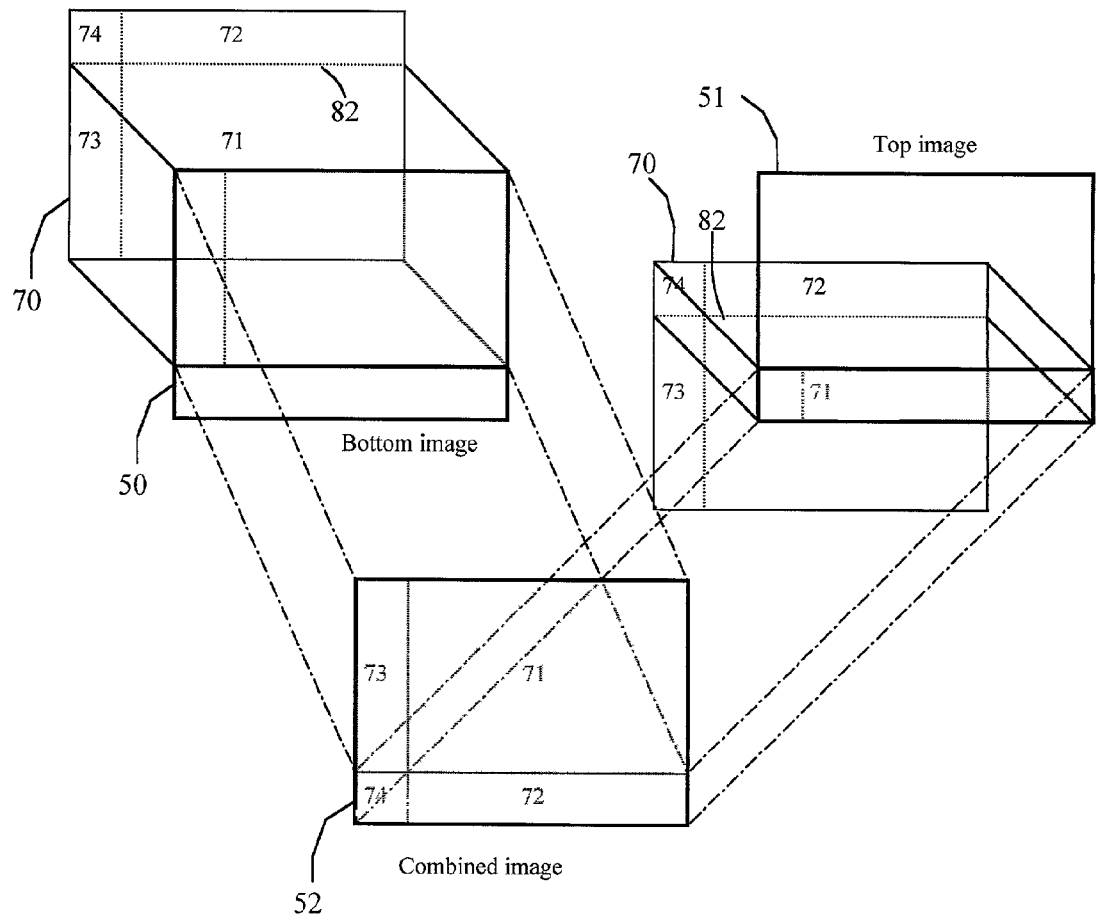
FIG. 15 illustrates a method of performing two shifts to imitate a vertically shifted-and-rotated arrangement of the calibration standard of FIG. 13.

FIG. 15 shows the process to obtain the image of a vertically shifted-and-rotated arrangement 52 of calibration standard 70.

First, calibration standard 70 is shifted up by 1 row so that line 82 is aligned with the top edge of the image of calibration standard 70 in its original position. Image 50 is acquired with calibration standard 70 in this position. The shaded area of image 50 contains regions in the imaginary parts 71 and 73 of calibration standard 70.

Secondly, calibration standard 70 down by M−1 rows (relative to its original position) so that line 82 is aligned with the bottom edge of the image of calibration standard 70 in its original position. Image 51 is then acquired with calibration standard in this position. The shaded area of image 51 contains regions in the imaginary parts 72 and 74 of calibration standard 70.

Finally, the image 50 and 51 are combined to form vertically shifted-and-rotated arrangement 52. Areas 71 and 73 in vertically shifted-and-rotated arrangement 52 are copied from the corresponding areas in image 50 and areas 72 and 74 in vertically shifted-and-rotated arrangement 52 are copied from the corresponding areas in image 51. The combined shifted-and-rotated arrangement 52 is essentially the same as if calibration standard 70 had been detached along line 82 and then re-assembled in a shifted-and-rotated calibration array and then imaged.

The shift operations in FIG. 14 and FIG. 15 can be accomplished by using either manual or computer-controlled XY positioning devices. It is preferable to have an accurate and reliable positioning device.

It is desirable that the regions RS(x, y) of horizontally and vertically shifted-and-rotated arrangements 42 and 52 align precisely with the regions RS(x, y) of the initial calibration standard. Due to various mechanical errors, this precise alignment may not be possible, especially in a microscopy application. Using a calibration standard with a top-left configurations as an example, a mis-alignment is indicated by: $P(x, y) \neq P^H(x, y)$ or $P(x, y) \neq P^V(x, y)$ for some or all (x, y). For example, $P(1, 1)=\{pxl(1, 1), pxl(2, 1), pxl(3, 1)\}$ and $p^H(1, 1)=\{pxl(2, 1), pxl(3, 1), pxl(4, 1)\}$. If P(x, y) is used as reference, i.e., the calibration regions of the initial setup of the calibration standard, the mis-alignment of $P^H(x, y)$ and/or $P^V(x, y)$ with P(x, y) introduces measurement error in $IC^H(x, y)$ and/or $IC^V(x, y)$. If the mis-alignment is significant, local correction functions (one for each calibration region) can be established and used to correct the measurement error in $IC^H(x, y)$ and/or $IC^V(x, y)$ due to the mis-alignment. Given image intensity IC(x, y) of a region with corresponding pixel set P'(x, y), this local correction function estimates the imaging intensity IC'(x, y) of the same region at pixel set P(x, y). This location correction function can be established by shifting and imaging the initial setup of a calibration standard around its default location. The image intensities of the calibration regions at different locations can then be used to define the local correction function parameters, using standard mathematical procedures. The established correction function should then be incorporated in the procedure 105 as shown in FIG. 7 to correct the measurement error if mis-alignment happens.

The measured image intensities, such as $IC^O(x, y)$, $IC^H(x, y)$ and $IC^V(x, y)$ in a top-left calibration standard (i.e. calibration standard 10 (FIG. 3)), are not error free. In additional to the mechanical positioning error mentioned above, the other sources of error are electronic, quantum noises and etc. These measurement errors may cause errors in calculation of shading errors, shading correction coefficients and region signal intensities.

For a top-left calibration standard, $\overline{IC^O}(x, y)$, $\overline{IC^H}(x, y)$ and $\overline{IC^V}(x, y)$ are the true image intensities (without measurement errors). The actual measurements can be expressed as:

$$IC^O(x, y) = \overline{IC^O}(x, y) \times (1 + e_P^O(x, y)) + e_A^O(x, y)$$

$$IC^H(x, y) = \overline{IC^H}(x, y) \times (1 + e_P^H(x, y)) + e_A^H(x, y)$$

$$IC^V(x, y) = \overline{IC^V}(x, y) \times (1 + e_P^V(x, y)) + e_A^V(x, y) \qquad \text{EQ. 22}$$

for x=1, ..., N and y=1, ..., M where: $e_P^O(x, y)$, $ep_P^H(x, y)$ and $e_P^V(x, y)$ are the proportional measurement errors, and $e_A^O(x, y)$, $e_A^H(x, y)$ and $e_P^V(x, y)$ are the additive measurement errors.

The corresponding solutions of shading error can be expressed as:

$$SE(x, y) = \overline{SE}(x, y) \times (1 + e_{SE}(x, y)) \qquad \text{EQ. 23}$$

for x=1, ..., N and y=1, ..., M where: $\overline{SE}(x, y)$ is the true shading error without error, and
$e_{SE}(x, y)$ is the calculation error due to the measurement error
$e_P^O(x, y)$, $e_P^H(x, y)$, $e_P^V(x, y)$, $e_A^O(x, y)$, $e_A^H(x, y)$ and $e_A^V(x, y)$.

The calculation error $e_{SE}(x, y)$ is summarized as a proportional error because of the relative nature of the shading error. Error $e_{SE}(x, y)$ depends on the measurement errors and size of the calibration standard (i.e., N and M). The larger the measurement errors, the larger the calculation error $e_{SE}(x, y)$, and the larger the size of the calibration array, the larger the calculation error $e_{SE}(x, y)$.

Similarly, we can define the calculation errors for other calibration standards (bottom right, etc.).

The magnitude of errors can be reduced by averaging multiple acquisitions and calculations from the same calibration standard, by averaging the results of different calibration standards, or by averaging the combination of both.

As an example of averaging multiple calculation from the same calibration standard, $SE^{(1)}(x, y)$ and $SE^{(2)}(x, y)$ may be defined as the results of two acquisitions and calculations of shading errors of an imaging system from a calibration standard with a top-left configuration. The averaged shading error can be defined as:

$$SE(x, y) = \frac{SE^{(1)}(x, y) + SE^{(2)}(x, y)}{2} \qquad \text{EQ. 24}$$

As an example of averaging different calibration standards, $SE^{TL}(x, y)$ may be defined as the results from a top-left calibration standard and $SE^{BR}(x, y)$ may be defined as the results from a bottom-right calibration standard. A simple averaged shading error can be defined as:

$$SE(x, y) = \frac{SE^{TL}(x, y) + SE^{BR}(x, y)}{2} \qquad \text{EQ. 25}$$

The statistics (such as mean and variance) of calculation error $e_{SE}(x, y)$ is position-dependent, even if such statistics of measurement error is position-independent (e.g., all $e_P^O(x, y)$, $e_P^H(x, y)$, $e_P^V(x, y)$, $e_A^O(x, y)$, $e_A^H(x, y)$ and $e_A^V(x, y)$ are $\mu$=0 and $\sigma$=0.1). By using standard statistical methods and knowledge of measurement error, the error mean $\mu_{ESE}(x, y)$ and error standard deviation $\sigma_{ESE}(x, y)$ of $e_{SE}(x, y)$ can be estimated for given measurement errors (e.g., Gaussian noise with $\mu$=0 and $\sigma$=1 for the additive measurement errors and Gaussian noise with $\mu$=0 and $\sigma$=0.05 for the proportional measurement errors). Using the error statistics $\mu_{ESE}(x, y)$ and $\sigma_{ESE}(x, y)$, weighting factors can be derived. Instead of using a simple averaging, a weighted averaging can be performed.

$$SE(x, y) = \frac{w^{TL}(x, y) \times SE^{TL}(x, y) + w^{BR}(x, y) \times SE^{BR}(x, y)}{w^{TL}(x, y) + w^{BR}(x, y)} \qquad \text{EQ. 26}$$

where: $w^{TL}(x, y)$ and $w^{BR}(x, y)$ are the weighting factors for the top-left configuration and bottom-right configuration respectively.

The weighted average will reduce the overall error and will also reduce the variance of error statistics. The weighting factor can exist in many forms. For example:

$$w^{TL}(x, y) = \frac{1}{\sigma_{ESE}^{TL}(x, y)} \text{ and } w^{BR}(x, y) = \frac{1}{\sigma_{ESE}^{BR}(x, y)} \qquad \text{EQ. 27}$$

Calculation error reduction of shading error will reduce the calculation error of shading correction coefficients. EQ. 23 to EQ. 27 describes error analysis and averaging methods for shading error. Similarly, we could also directly analyze and average shading correction coefficients as well.

In calibration standard N and M were defined to be greater than 1. If one of N or M is equal to one, the system becomes a 1D (1-dimensional) case. For example, the image sensor array consists of one row or one column of sensor elements, or only one row of regions is of interest. Without loss of generality, the following discussions will be based on a horizontal 1D array. A vertical 1D array will be simply rotated 90 degree. The naming convention for the calibration standards and shifted-and-rotated arrangements is similar to the 2D case.

Figure 16:
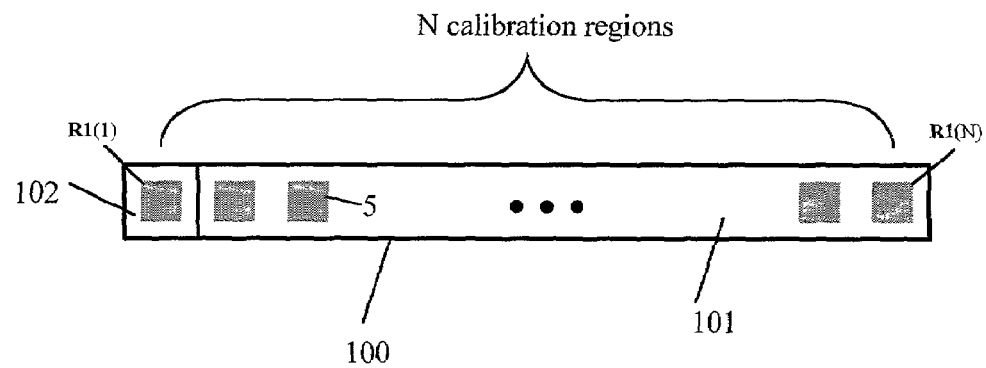
FIG. 16 is an illustration of a one-dimensional calibration standard with a left configuration.
Figure 17:
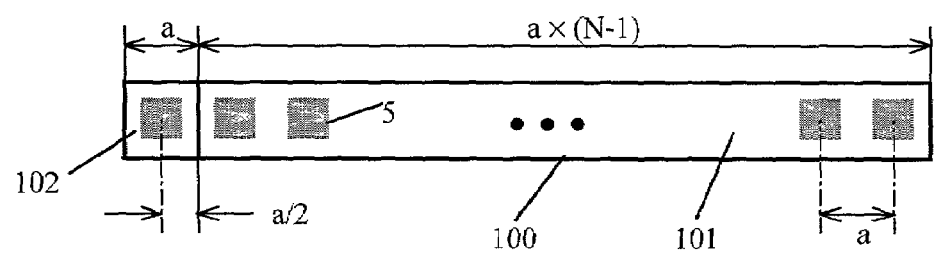
FIG. 17 shows the dimensions of the calibration standard of FIG. 16.

FIG. 16 illustrates a one dimensional calibration standard 100 with a left configuration. The calibration standard 100 contains N uniformly spaced regions. In the 1D case, N has to be greater than one. The left part 102 consists of one region 5, and right part consists of N−1 regions 5. FIG. 17 shows the spatial dimensions of standard 100. "a" is the interval of regions 5. The regions 5 are referred to as R1(x).

Figure 18:
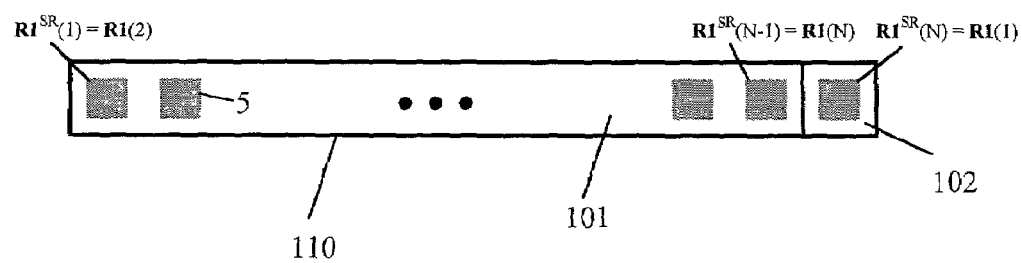
FIG. 18 is an illustration of a shifted-and-rotated arrangement of the calibration standard of FIG. 16.

FIG. 18 illustrates a shifted-and-rotated arrangement 110 of calibration standard 100. The shift-and-rotation is done by shifting the entire calibration standard 100 (in FIG. 16) to right by one column and then moving part 102 to the right of part 101. The re-arranged calibration regions 5 are referred to as $R1^{SR}(x)$, and:

Content($R1^{SR}(x)$)=Content($R1$(Mod(x+1, N))) for x=1, ..., N  EQ. 28

As with the 2D case, calibration regions of the shifted-and-rotated arrangement 110 are required to be in alignment with the regions 5 of the initial calibration standard 100. That is:

$P1^{SR}(x) = P1(x)$ for x=1, ..., N  RQ. 3 where: P1(x) is the pixel set corresponding to region R1(x), and
P1$^{SR}$(x) is the pixel set corresponding to region R1$^{SR}$(x).

Similar to the 2D case, the following relationship can be developed:

$$IC1^O(x) = G1 \times SE1(x) \times VC1(x) \text{ for } x=1, \ldots, N \qquad \text{EQ. 29}$$

where: $IC1^O(x)$ is the image intensity of the region R1(x, y) shown in FIG. 16.
SE1(x) is the shading error of the region R1(x, y).
VC1(x) is the signal intensity of the region R1(x, y)
G1 is the imaging system gain.

And:

$$IC1_L{}^O(x) = G1_L + SE1_L(x) + VC1_L(x) \text{ for } x=1, \ldots, N \qquad \text{EQ. 30}$$

$$IC1_L{}^{SR}(x) = G1_L + SE1_L(x) + VC1_L(\text{Mod}(x+1, N)) \text{ for } x=1, \ldots, N \qquad \text{EQ. 31}$$

where:

$$IC1_L{}^O(x) = \ln(IC1^O(x))$$

$IC1_L{}^{SR}(x) = \ln(IC^{SR}(x))$, and $IC1^{SR}(x)$ is the image intensity of region 5 R1$^{SR}$(x, y) shown in FIG. 18.

$$SE1_L(x) = \ln(SE1_L(x))$$

$$VC1_L(x) = \ln(VC1(x))$$

$$G1_L = \ln(G1)$$

And:

$$ICS1(x) = SE1_L(x) - SE1_L(\text{Mod}(x+1, N)) \text{ for } x=1, \ldots, N \qquad \text{EQ. 32}$$

where:

$$ICS1(x) = IC1_L{}^{SR}(x) - IC1_L{}^O(\text{Mod}(x+1, N))$$

As with the 2D case, SE1$_L$(X) can be resolved from EQ. 32 if one of the values is specified.

Similar to the 2D case, SE1(x) is defined as the solution (intermediate shading error) of EQ. 32 when SE1$_L$(N)=1, and the shading errors, defined in EQ. 33, are uniquely defined.

$$SEI(x) = \frac{e^{SII(x)}}{\frac{1}{N}\sum_{i=1}^{N} e^{SII(i)}} \text{ for } x = 1, \ldots, N \qquad \text{EQ. 33}$$

Once the shading error is calculated, the shading correction coefficients SC1(x), signal intensity VC1(x), and relative signal intensity VC1$_R$(x) can be calculated.

$$SCI(x) = \frac{1}{SEI(x)} \text{ for } x = 1, \ldots, N \qquad \text{EQ. 34}$$

$$VCI(x) = \frac{ICI^0(x)}{G1 \times SEI(x)} \text{ for } x = 1, \ldots, N \qquad \text{EQ. 35}$$

$$VCI_R(x) = \frac{ICI^0(x)/SEI(x)}{\frac{1}{N}\sum_{i=1}^{N} ICI^0(i)/SEI(i)} \text{ for } x = 1, \ldots, N \qquad \text{EQ. 36}$$

As with the 2D case (FIG. 14), the shading errors can also be calculated from a right configuration as well. FIG. 16 and FIG. 18 show mat the right configuration is symmetrical to the left configuration. That is, the initial setup of a right calibration standard is the shifted-and-rotated arrangement 110 of a left calibration standard and vice versa. Therefore, there is no difference between a left configuration and a right configuration, except in the order they are given to an imaging system.

As with the 2D case (FIG. 14), the shift-and-rotation can be achieved by two shifts in the case where the detachable configuration is not convenient or impossible to fabricate.

Figure 19:
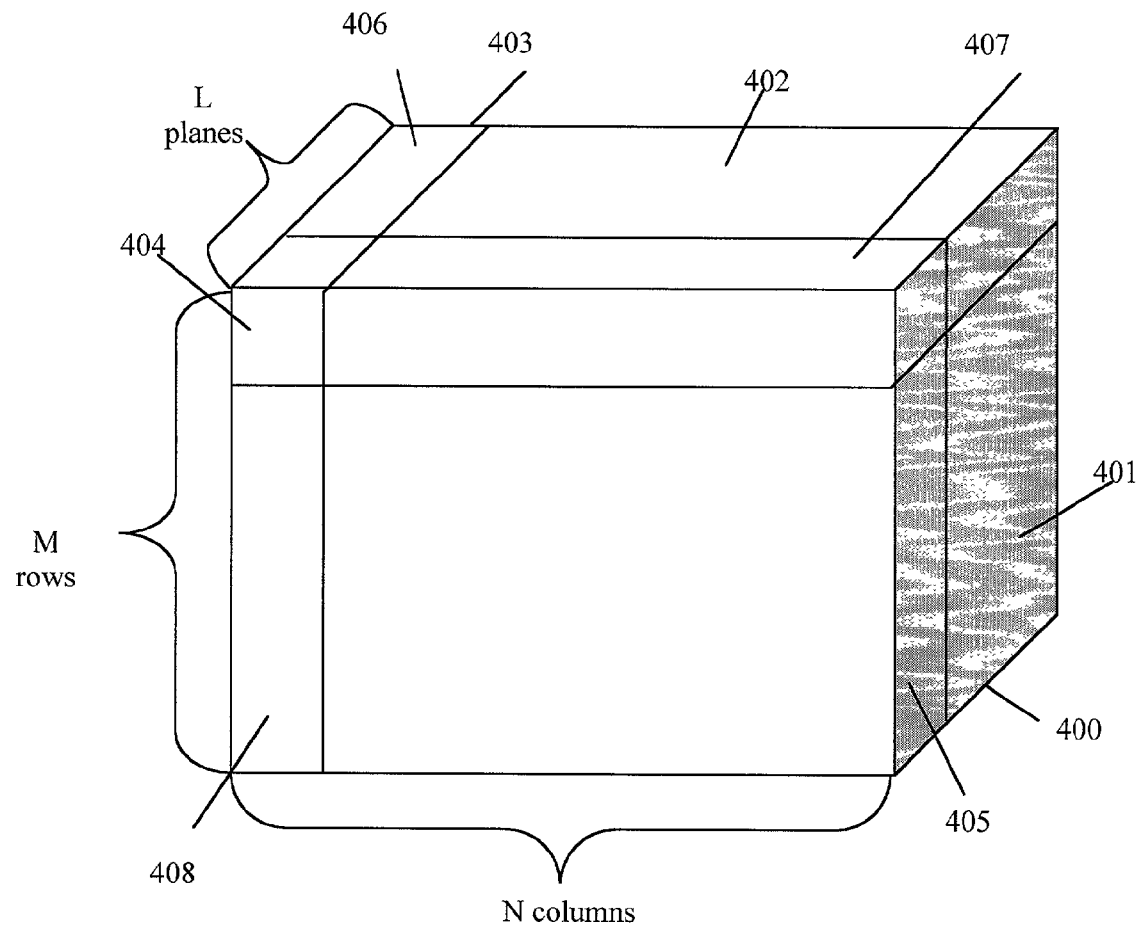
FIG. 19 is an illustration of a three-dimensional calibration standard with a top-left-front configuration.

We have presented both 1D and 2D cases. The same shift-and-rotation principle can be extended to the 3D (3-dimensional) domain as well. In the 3D domain, the field of view is 3 dimensional, and a calibration region becomes a calibration cube. The extension of a 2D calibration standard with a top-left configuration is a 3D calibration standard with a top-left-front configuration as shown in FIG. 19. The calibration standard 400 has N×M×L calibration cubes and has 8 detachable parts. Part 401 consists of (N-1)×(M-1)×(L-1) calibration cubes; part 402 has (N-1)×(L-1) calibration cubes; part 403, which is not visible (blocked by parts 406 and 408) in this figure, consists of (M-1)×(L-1) calibration cubes; part 404 consists of 1 calibration cube; part 405 consists of (N-1)×(M-1) calibration cubes; part 406 consists of (L-1) calibration cubes; part 407 consists of (N-1) calibration cubes; and part 408 consists of (M-1) calibration cubes. The configuration is named as top-left-front because of the position of part 404 is at top-left-front. A horizontally shifted-and-rotated arrangement of the calibration standard 400 will be done by shifting the entire standard 400 to the left by one column and then moving parts 403, 404, 406 and 408 to the right side of the parts 401, 407, 402 and 405 respectively. Similarly, the vertically shifted-and-rotated arrangement and the front-to-back shifted-and-rotated arrangement will be form in a similar manner.

The shading errors SE3(x, y, z) of the calibration cubes can be resolved from the 3D image intensities of the initial setup, the horizontally shifted-and-rotated arrangement, vertically shifted-and-rotated arrangement and the front-to-back shifted-and-rotated arrangement. All the mathematical deductions are similar to the 2D case.

Reference is again made to FIG. 3. The method of the present invention allows the log-transformed shading error (SE$_L$ in EQ. 11 or EQ. 12) of each region 5 to be represented as a factor of the log-transformed shading errors of other regions 5. An intermediate shading error for each region may be calculated using standard matrix techniques, if the shading error for one region is specified (assuming that corner part 4 has a single region so that matrix A in EQ. 12 has a rank of N×M-1). The shading error may then be calculated as the normalized value of the intermediate shading error (EQ. 13 or EQ. 16). The effect of the selection in the intermediate shading errors is eliminated by the normalization.

Reference is made to EQ. 13, EQ. 16 and EQ. 33. Due to relative nature of shading correction, the normalization to derive a unique shading error is not completely necessary. In other words, the intermediate shading errors could be used to derive the shading correction coefficients. In this case, there may be an embedded system gain to the subsequently corrected images.

Referring to FIGS. 5 and 6, calibration standard 10 is re-arranged into horizontally shifted-and-rotated arrangements 11 and 12. Any other re-arrangements of calibration standard 10 which (i) allow the shading error of each region 5 in calibration standard 10 to be defined in terms of the shading errors of other regions and (ii) allow the shading error of each region 5 to be solved by specifying an shading error for one (or more) regions, may be used in the method of the present invention. A person skilled in the art will be capable of developing equations corresponding to EQ. 12 which allow the relative shading error for each region 5 to be solved.

Several embodiments have been described in details as examples of the present invention. These embodiments may be modified and varied without departing from the spirit and scope of the invention, which is limited only by the appended claims.

I claim:

1. A method for calculating shading correction coefficients for an imaging system, comprising the steps of:
   i. defining a set of calibration regions on a calibration standard;
   ii. defining a first part and a second part of said calibration standard, wherein each of said first and second parts contains at least one calibration region;
   iii. taking an image of said calibration standard and calculating an initial image intensity for each of said calibration regions, thereby providing a set of initial image intensities;
   iv. re-arranging said first and second parts to form a re-arrangement of said calibration standard;
   v. taking an image of said re-arrangement and calculating a re-arranged image intensity for each of said calibration regions, thereby providing a set of re-arranged image intensities;
   vi. calculating a shading error for each of said calibration regions; and
   vii. calculating a shading correction coefficient for each of said calibration regions.

2. The method of claim 1 wherein step (vi) is performed by:
   (a) defining a relationship between the set of initial image intensities and the set of re-arranged image intensities, wherein said relationship defines a relative shading error for each of said calibrations regions;
   (b) specifying a preliminary shading error for a selected number of said calibration regions; and
   (c) using said relationship to determined the relative shading error for the remaining calibration regions.

3. The method of claim 2 wherein the selected number is equal to the number of calibration regions in the second part.

4. The method of claim 2 wherein the second part contains one calibration regions and wherein said selected number is one.

5. The method of claim 1 wherein step (vi) includes normalizing the shading errors for all of said calibration regions, so that the average of said shading errors equals a selected value.

6. The method of claim 5 wherein the selected value is one.

7. The method of claim 1 wherein step (vii) includes normalizing the shading correction coefficients for all of said calibration regions, so that the average of said shading correction coefficients equals a selected value.

8. The method of claim 7 wherein the selected value is one.

9. The method of claim 1 wherein step (iv) is performed by physically detaching said calibration standard to separate said first and second parts and then reattaching the first and second parts to form said re-arrangement and wherein, in step (v), the re-arrangement is positioned in said imaging system in a position corresponding to the position of the calibration standard in step (iii).

10. The method of claim 9 wherein, in step (v), the re-arrangement is positioned in said imaging system so that said calibration regions of said re-arrangement are aligned with the positions of the calibration regions of the calibration standard in step (iii).

11. The method of claim 1 wherein each of said calibration regions includes material having one or more characteristics corresponding to an object to be imaged using said imaging system.

12. The method of claim 1 wherein the calibration standard is shaped to correspond to the field of view of the imaging system.

13. The method of claim 1 wherein the calibration standard is shaped to correspond to a portion of the field of view of the imaging system.

14. The method claim 1 wherein the calibration standard is shaped to correspond to shape of an object to be imaged using the imaging system.

15. The method of claim 1 wherein said calibration regions are spaced apart.

16. The method of claim 1 wherein said calibrations regions are spaced at regular intervals.

17. The method of claim 1 wherein said calibrations regions are not spaced apart.

18. The method of claim 1 wherein, in step (iii), said calibration standard is imaged in an initial position, and wherein steps (iv) and (v) are accomplished by:
   (a) shifting said calibration standard in a first direction by a distance corresponding to said first part and then taking a first shifted image of said calibration standard and returning said calibration standard to its initial position;
   (b) shifting said calibration standard in a second direction by a distance corresponding to said second part and then taking a second shifted image of said calibration standard;
   (c) combining portions of said first and second shifted images to form said re-arrangement of said calibration standard.

19. The method of claim 1 wherein said first part includes only one calibration region.

20. The method of claim 1 wherein steps (i) to (vii) are first performed in respect of a first calibration standard to obtain a first shading correction coefficient for each of said calibration regions and wherein steps (i) to (vii) are repeated in respect of a second calibration standard to obtain a second shading correction coefficient for each of said calibration regions and wherein, for each said calibration regions, said first and second correction coefficients for each said calibration region are combined to provide a final shading correction co-efficient.

21. The method of claim 20 wherein said first and second shading correction coefficients are combined by averaging them.

22. The method of claim 20 wherein said first and second shading correction coefficients are combined by taking a weighted average between them.

23. The method of claim 22 wherein the weighting of the weighted average is based on the error mean of the first and second shading correction coefficients.

24. The method of claim 22 wherein the weighting of the weighted average is based on the error mean and the error standard deviation of the first and second shading correction coefficients.

25. The method of claim 1 wherein the calibration standard is shaped to correspond to a portion of the field of view of the imaging system.

26. The method of claim 1 wherein steps (i) to (vii) are first performed in respect of a first calibration standard to obtain a first shading correction coefficient for each of said calibration regions and wherein steps (i) to (vii) are repeated in respect of a second calibration standard to obtain a second shading correction coefficient for each of said calibration regions and wherein, for each said calibration regions, said first and second correction coefficients for each said calibration region are combined to provide a final shading correction co-efficient.

27. The method of claim 26 wherein said first and second shading correction coefficients are combined by averaging them.

28. The method of claim 26 wherein said first and second shading correction coefficients are combined by taking a weighted average between them.

29. The method of claim 28 wherein the weighting of the weighted average is based on the error mean of the first and second shading correction coefficients.

30. The method of claim 28 wherein the weighting of the weighted average is based on the error mean and the error standard deviation of the first and second shading correction coefficients.

31. A method for calculating shading correction coefficients for an imaging system, comprising the steps of:
   i. defining a set of calibration regions on a calibration standard;
   ii. defining a first part, a second part, a third part and a fourth part of said calibration standard, wherein each of said first, second, third and fourth parts contains at least one calibration region;
   iii. taking an image of said calibration standard and calculating an initial image intensity for each of said calibration regions;
   iv. re-arranging said first, second, third and fourth parts in a first direction to form a first re-arrangement of said calibration standard;
   v. taking an image of said first re-arrangement and calculating a first re-arranged image intensity for each of said calibration regions;
   vi. re-arranging said first, second, third and fourth parts in a second direction to form a second re-arrangement of said calibration standard;
   vii. taking an image of said second re-arrangement and calculating a second re-arranged image intensity for each of said calibration regions;
   viii. calculating a shading error for each of said calibration regions; and
   ix. calculating a shading correction coefficient for each of said calibration regions.

32. The method of claim 31 wherein step (viii) is performed by:
   (a) defining a relationship between the set of initial image intensities and the set of re-arranged image intensities, wherein said relationship defines a relative shading error for each of said calibrations regions;
   (b) specifying a preliminary shading error for a selected number of said calibration regions; and
   (c) using said relationship to determined the relative shading error for the remaining calibration regions.

33. The method of claim 32 wherein the selected number is equal to the number of calibration regions in the fourth part.

34. The method of claim 32 wherein the fourth part contains one calibration regions and wherein said selected number is one.

35. The method of claim 31 wherein step (viii) includes normalizing the shading errors for all of said calibration regions, so that the average of said shading errors equals a selected value.

36. The method of claim 35 wherein the selected value is one.

37. The method of claim 31 wherein step (ix) includes normalizing the shading correction coefficients for all of said calibration regions, so that the average of said shading correction coefficients equals a selected value.

38. The method of claim 37 wherein the selected value is one.

39. The method of claim 31 wherein step (iv) is performed by physically detaching said calibration standard to separate said first and second parts from said third and fourth parts and then reattaching the first and second parts to said third and fourth parts to form said first re-arrangement and wherein, in step (v), the first re-arrangement is positioned in said imaging system in a position corresponding to the position of the calibration standard in step (iii).

40. The method of claim 39 wherein, in step (v), the first re-arrangement is positioned in said imaging system so that said calibration regions of said first re-arrangement are aligned with the positions of the calibration regions of the calibration standard in step (iii).

41. The method of claim 31 wherein step (vi) is performed by physically detaching said calibration standard to separate said first and third parts from said second and fourth parts and then reattaching the first and third parts to said second and fourth parts to form said second re-arrangement and wherein, in step (vii), the second re-arrangement is positioned in said imaging system in a position corresponding to the position of the calibration standard in step (iii).

42. The method of claim 41 wherein, in step (v), the second re-arrangement is positioned in said imaging system so that said calibration regions of said second re-arrangement are aligned with the positions of the calibration regions of the calibration standard in step (iii).

43. The method of claim 31 wherein each of said calibration regions includes material having one or more characteristics corresponding to an object to be imaged using said imaging system.

44. The method of claim 31 wherein the calibration standard is shaped to correspond to the field of view of the imaging system.

45. The method claim 31 wherein the calibration standard is shaped to correspond to shape of an object to be imaged using the imaging system.

46. The method of claim 31 wherein said calibration regions are spaced apart.

47. The method of claim 31 wherein said calibrations regions are spaced at regular horizontal intervals and at regular vertical intervals.

48. The method of claim 47 wherein said horizontal intervals are equal to said vertical intervals.

49. The method of claim 31 wherein said calibrations regions are not spaced apart.

50. The method of claim 31 wherein, in step (iii) said calibration standard is imaged in an initial position, and wherein steps (iv) and (v) are accomplished by:
   (a) shifting said calibration standard in a first direction by distance corresponding to said first part and then taking a first shifted image of said calibration standard and returning said calibration standard to its initial position;

(b) shifting said calibration standard in a second direction by a distance corresponding to said second part and then taking a second shifted image of said calibration standard and returning said calibration standard to its initial position;

(c) combining portions of said first and second shifted images to form said first re-arrangement of said calibration standard, and wherein calibration steps (vi) and (vii) are accomplished by:

(d) shifting said calibration standard in a third direction by distance corresponding to said first part and then taking a third shifted image of said calibration standard and returning said calibration standard to its initial position;

(e) shifting said calibration standard in a fourth direction by a distance corresponding to said third part and then taking a fourth shifted image of said calibration standard and returning said calibration standard to its initial position;

(f) combining portions of said third and fourth shifted images to form said second re-arrangement of said calibration standard.

51. The method of claim 31 wherein said first part includes only one calibration region.

52. The method of claim 31 wherein said first part includes a rectangular array of calibration regions and wherein said second part includes an array of calibration regions adjacent to one side of said calibration standard and wherein said third part includes an array of calibration regions adjacent to a second side of said calibration standard and wherein said fourth part includes at least one calibration regions adjacent said second and third parts.

* * * * *

UNITED STATES PATENT AND TRADEMARK OFFICE
CERTIFICATE OF CORRECTION

PATENT NO. : 6,996,288 B2 Page 1 of 1
APPLICATION NO. : 09/964607
DATED : February 7, 2006
INVENTOR(S) : Sun It is certified that error appears in the above-identified patent and that said Letters Patent is hereby corrected as shown below:

Column 5, line 30, the word "later" should be deleted

Column 16, line 3, should read --The statistics (such as mean and variance) of calculation error $e_{SE}$ (x, y) is position-dependent, even if such statistics of measurement error is position-independent (e.g., all $e_P^O(x,y), e_P^H(x,y), e_P^V(x,y), e_A^O(x,y), e_A^H(x,y)$ and $e_A^V(x,y)$ are Gaussian noise with $\mu = 0$ and $\sigma = 0.1$).--.

Signed and Sealed this

Third Day of October, 2006

JON W. DUDAS
*Director of the United States Patent and Trademark Office*